United States Patent
Sawada et al.

(10) Patent No.: US 6,263,667 B1
(45) Date of Patent: Jul. 24, 2001

(54) EXHAUST GAS PURIFICATION DEVICE FOR AN INTERNAL COMBUSTION ENGINE

(75) Inventors: Hiroshi Sawada, Gotenba; Junichi Kako, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/664,449

(22) Filed: Sep. 18, 2000

Related U.S. Application Data

(62) Division of application No. 09/151,230, filed on Sep. 10, 1998, now Pat. No. 6,138,453.

(30) Foreign Application Priority Data

Sep. 19, 1997 (JP) .................................................. 9-254670
Sep. 19, 1997 (JP) .................................................. 9-255090

(51) Int. Cl.7 .................................................. F01N 3/00
(52) U.S. Cl. ................ 60/277; 60/276; 60/285; 60/297; 122/443
(58) Field of Search ............. 60/276, 277, 285, 60/286, 295, 297, 301; 123/443, 691

(56) References Cited

U.S. PATENT DOCUMENTS

| | | |
|---|---|---|
| 5,325,664 | 7/1994 | Seki et al. . |
| 5,448,887 * | 9/1995 | Takeshima et al. ................... 60/278 |
| 5,577,382 * | 11/1996 | Kihara et al. ........................ 60/276 |
| 5,732,553 * | 3/1998 | Mitsutani .............................. 60/276 |
| 5,778,667 * | 7/1998 | Kinugasa et al. ...................... 60/274 |

(List continued on next page.)

FOREIGN PATENT DOCUMENTS

| | | |
|---|---|---|
| WO94/17291 | 8/1994 | (EP) . |
| 690213 | 1/1996 | (EP) . |
| 3-74540 | 3/1991 | (JP) . |
| 5-26032 | 2/1993 | (JP) . |
| 5-133264 | 5/1993 | (JP) . |

(List continued on next page.)

OTHER PUBLICATIONS

Copending U.S. application Ser. No. 974,843, filed Nov. 10, 1992.

Copending U.S. application Ser. No. 988,328, filed Dec. 9, 1992.

(List continued on next page.)

*Primary Examiner*—Thomas Denion
*Assistant Examiner*—Binh Tran
(74) *Attorney, Agent, or Firm*—Kenyon & Kenyon

(57) ABSTRACT

In an exhaust gas purification device for an internal combustion engine, a $NO_X$ occluding and reducing catalyst is disposed in the exhaust gas passage of an engine. The $NO_X$ occluding and reducing catalyst absorbs $NO_X$ in the exhaust gas when the air-fuel ratio of the exhaust gas is at a lean air-fuel ratio and releases and reduces $NO_X$ when the air-fuel ratio of the exhaust gas is at a rich air-fuel ratio. The air-fuel ratio of the exhaust gas flowing out from the catalyst is detected by an air-fuel ratio sensor disposed in the exhaust gas passage downstream of the catalyst. When the air-fuel ratio of the exhaust gas flowing into the catalyst is changed from a rich air-fuel ratio to a lean air-fuel ratio, the air-fuel ratio of the exhaust gas flowing out from the catalyst stays at a stoichiometric air-fuel ratio before it changes to a lean air-fuel ratio. The length of the period in which the air-fuel ratio of the exhaust gas flowing out from the catalyst stays at a stoichiometric air-fuel ratio corresponds to the magnitude of the ability of the $NO_X$ occluding and reducing catalyst as a reducing catalyst. Thus, by measuring the length of the stoichiometric air-fuel ratio period of the exhaust gas flowing out from the $NO_X$ occluding and reducing catalyst, the ability of the $NO_X$ occluding and reducing catalyst as a reducing catalyst can be precisely evaluated.

12 Claims, 16 Drawing Sheets

U.S. PATENT DOCUMENTS

| | | | | |
|---|---|---|---|---|
| 5,970,707 | * | 10/1999 | Sawada et al. | 60/277 |
| 5,974,793 | * | 11/1999 | Kinugasa et al. | 60/285 |
| 5,983,629 | * | 11/1999 | Sawada et al. | 60/276 |
| 6,109,024 | * | 8/2000 | Kinugasa et al. | 60/285 |
| 6,138,453 | * | 10/2000 | Sawada et al. | 60/277 |

FOREIGN PATENT DOCUMENTS

| | | |
|---|---|---|
| 5-171922 | 7/1993 | (JP) . |
| 5-209510 | 8/1993 | (JP) . |
| 6-117310 | 4/1994 | (JP) . |
| 8-14030 | 1/1996 | (JP) . |
| 8014031 | 1/1996 | (JP) . |
| 8-232644 | 9/1996 | (JP) . |
| 8-260949 | 10/1996 | (JP) . |
| 9-88560 | 3/1997 | (JP) . |

OTHER PUBLICATIONS

Copending U.S. application Ser. No. 295,917, filed Jan. 14, 1994.

Copending U.S. application Ser. No. 493,657, filed Jun. 22, 1995.

Copending U.S. application Ser. No. 620,623, filed Mar. 22, 1996.

Copending U.S. application Ser. No. 624,034, filed Mar. 27, 1996.

* cited by examiner

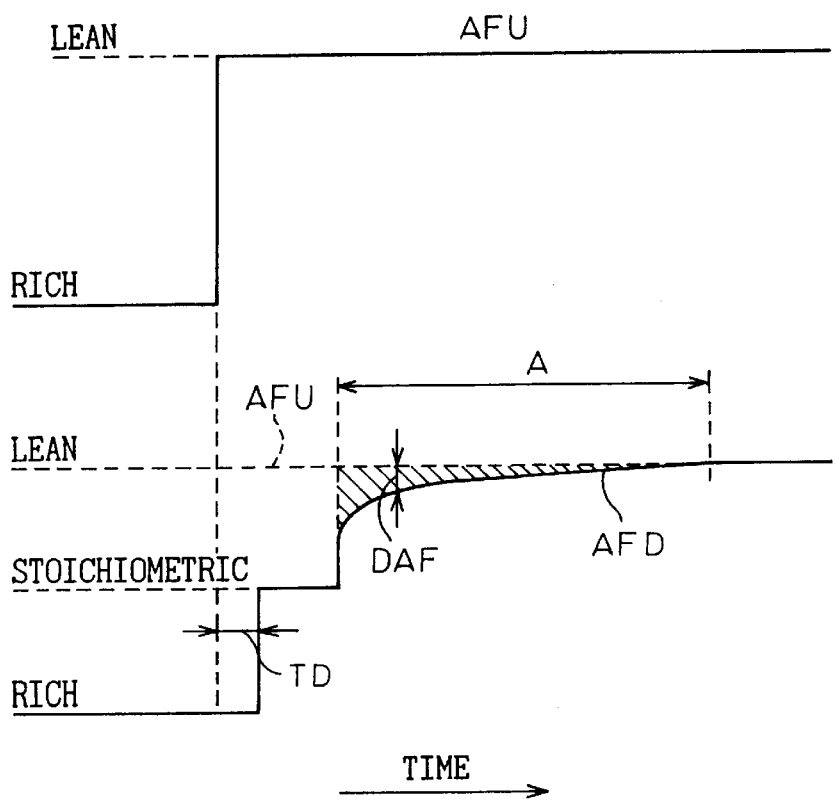

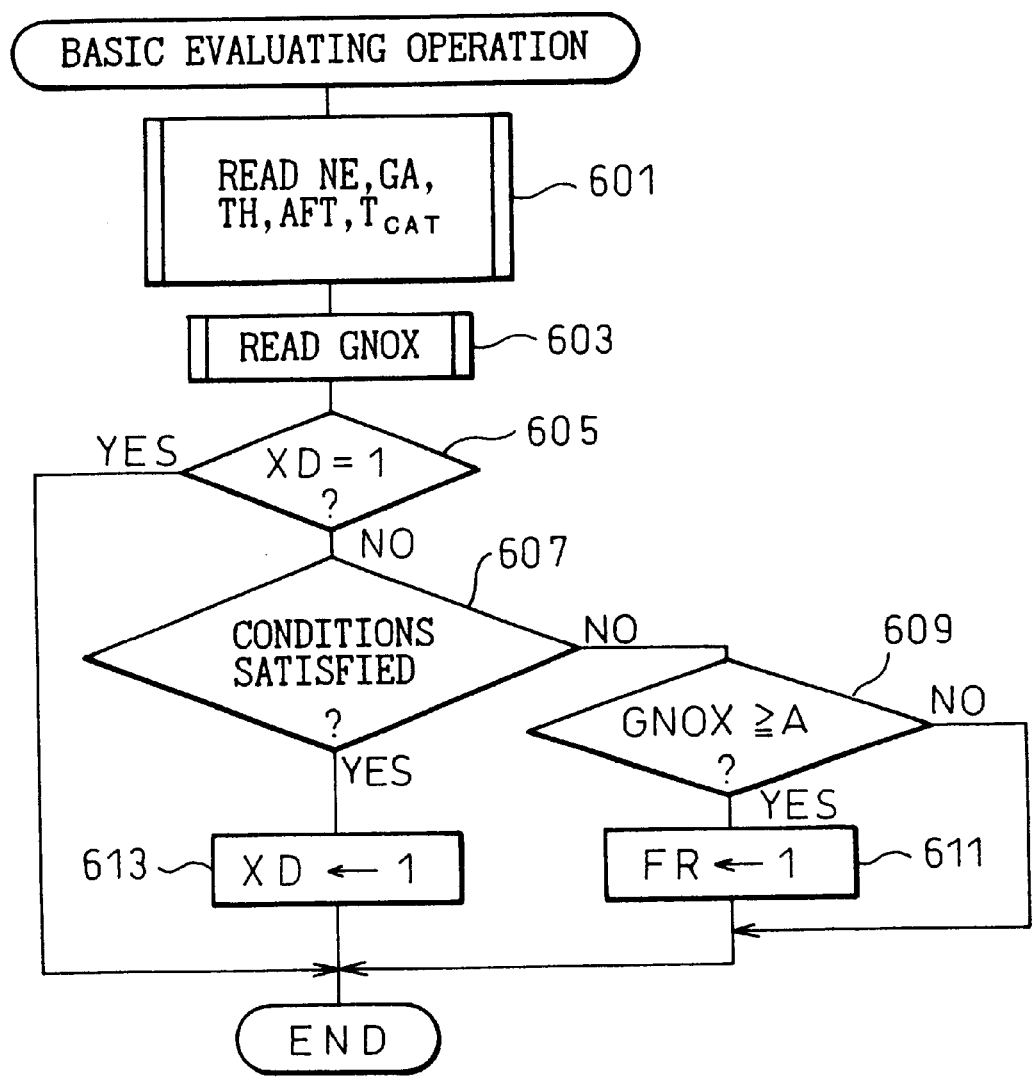

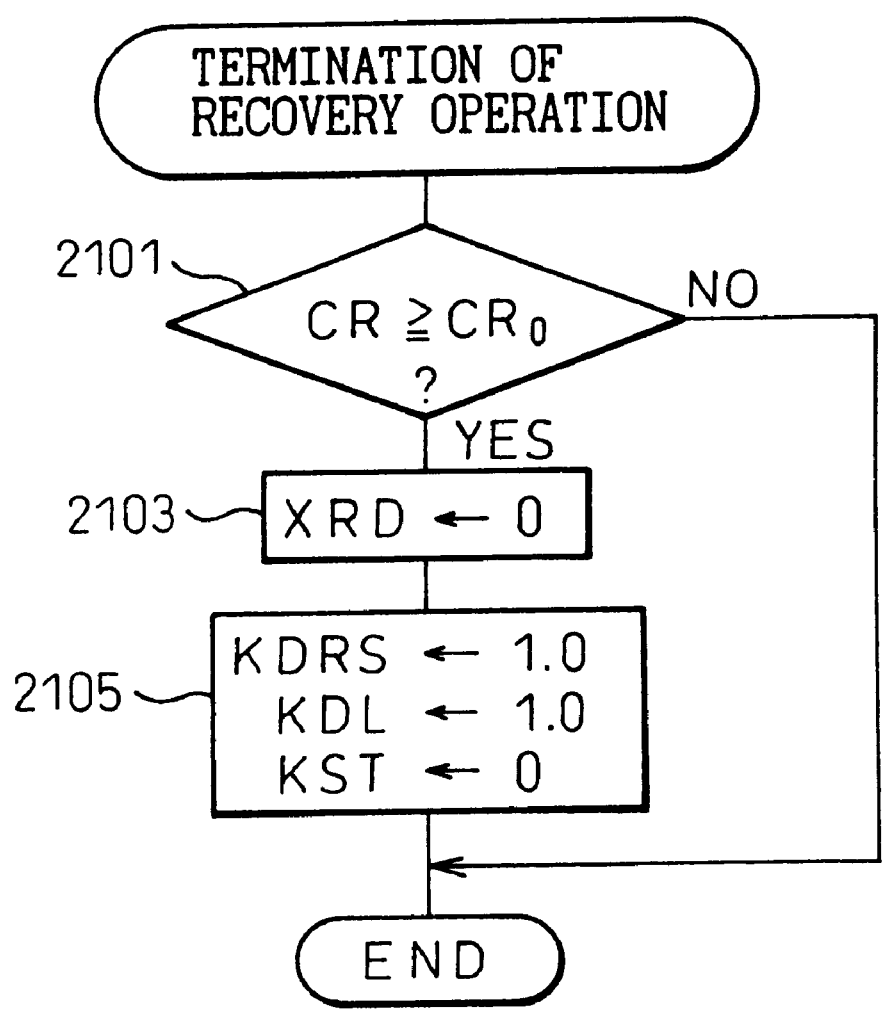

EXHAUST GAS PURIFICATION DEVICE FOR AN INTERNAL COMBUSTION ENGINE

This is a division of application Ser. No. 09/151,230 filed Sep. 10, 1998 is now U.S. Pat. No. 6,138,453.

BACKGROUND OF THE INVENTION

1. Field of the Invention

The present invention relates to an exhaust gas purification device for an internal combustion engine.

2. Description of the Related Art

Exhaust gas purification devices utilizing $NO_X$ occluding and reducing catalysts are known in the art. A $NO_X$ occluding and reducing catalyst absorbs $NO_X$ in the exhaust gas when the air-fuel ratio of the exhaust gas flowing into the catalyst is lean, and releases the absorbed $NO_X$ and reduces the released $NO_X$ and $NO_X$ in the exhaust gas flowing into the catalyst when the air-fuel ratio of the exhaust gas flowing into the catalyst is a stoichiometric or a rich air-fuel ratio (In this specification, the term "air-fuel ratio of the exhaust gas" means the ratio of the amounts of air and fuel supplied to the engine and exhaust gas passage upstream of a considered point). In this type of the exhaust gas purification device, a $NO_X$ occluding and reducing catalyst is disposed in the exhaust gas passage of an internal combustion engine and absorbs $NO_X$ in the exhaust gas when the engine is operated at a lean air-fuel ratio, thus, $NO_X$ in the exhaust gas is removed. Further, in order to prevent the $NO_X$ occluding and reducing catalyst from being saturated with the absorbed $NO_X$, the engine is operated at a rich air-fuel ratio for a short period after the operation at a lean air-fuel ratio has continued for a predetermined period. When the engine is operated at a rich air-fuel ratio, exhaust gas of a rich air-fuel ratio flows into the $NO_X$ occluding and reducing catalyst and the $NO_X$ absorbed in the catalyst is released and reduced. Thus, $NO_X$ is not diffused into the atmosphere.

However, the capacity of a $NO_X$ occluding and reducing catalyst for absorbing $NO_X$ becomes lower as the catalyst deteriorates. Therefore, when the $NO_X$ occluding and reducing catalyst has deteriorated to some extent, the catalyst absorbs $NO_X$ in the exhaust gas to its maximum capacity (i.e., the catalyst is saturated by the absorbed $NO_X$) before the rich air-fuel ratio operation of the engine is carried out. In this case, $NO_X$ in the exhaust gas passes through the $NO_X$ occluding and reducing catalyst without being absorbed therein and diffuses into the atmosphere. Therefore, it is important to determine whether the $NO_X$ occluding and reducing catalyst has deteriorated.

Heretofore, various exhaust gas purification devices having means for determining the deterioration of the $NO_X$ occluding and reducing catalyst have been proposed. One example of this type of exhaust gas purification device is disclosed in Japanese Unexamined Patent Publication (Kokai) No. 8-232644. The device in the '644 publication is provided with an air-fuel ratio sensor, disposed in the exhaust gas passage downstream of the $NO_X$ occluding and reducing catalyst, which detects the air-fuel ratio of the exhaust gas flowing out from the catalyst. The device determines the deterioration of the $NO_X$ occluding and reducing catalyst based on the change in the air-fuel ratio detected by the air-fuel ratio sensor. More specifically, the device in the '644 publication supplies exhaust gas of a lean air-fuel ratio to the $NO_X$ occluding and reducing catalyst for a period sufficient for the $NO_X$ occluding and reducing catalyst to absorb $NO_X$ in the exhaust gas to its maximum capacity. After the $NO_X$ occluding and reducing catalyst is saturated with the absorbed $NO_X$, the device in the '644 publication switches the air-fuel ratio of the exhaust gas flowing into the $NO_X$ occluding and reducing catalyst from a lean air-fuel ratio to a rich air-fuel ratio, and determines the deterioration of the catalyst based on the time lapsed, when the air-fuel ratio of the exhaust gas flowing into the catalyst changes to a rich air-fuel ratio, since the air-fuel ratio of the exhaust gas flowing into the catalyst was switched to a rich air-fuel ratio.

As explained before, $NO_X$ absorbed in the $NO_X$ occluding and reducing catalyst is released when a rich air-fuel ratio exhaust gas is supplied to the catalyst. The released $NO_X$ is reduced by reacting with HC and CO in the rich air-fuel ratio exhaust gas. In other words, HC and CO in the exhaust gas are oxidized by the $NO_X$ released from the catalyst. Therefore, the air-fuel ratio of the exhaust gas passing through the catalyst shifts to a lean air-fuel ratio side by this oxidation and the air-fuel ratio of the exhaust gas flowing out from the catalyst becomes leaner than the air-fuel ratio of the exhaust gas flowing into the catalyst. In this case, since the release of $NO_X$ stops when the atmosphere of the catalyst becomes leaner than the stoichiometric air-fuel ratio, the atmosphere of the catalyst becomes near the stoichiometric air-fuel ratio (in the actual operation, an air-fuel ratio slightly higher (leaner) than the stoichiometric air-fuel ratio) when the $NO_X$ occluding and reducing catalyst is releasing the absorbed $NO_X$. Therefore, the air-fuel ratio of the exhaust gas flowing out from the $NO_X$ occluding and reducing catalyst is maintained near the stoichiometric air-fuel ratio when the absorbed $NO_X$ is released from the catalyst even though the air-fuel ratio of the exhaust gas flowing into the catalyst is a rich air-fuel ratio. When the $NO_X$ occluding and reducing catalyst releases all the absorbed $NO_X$, since the oxidation of HC and CO in the exhaust gas by the released $NO_X$ stops, the air-fuel ratio of the exhaust gas flowing out from the catalyst becomes an air-fuel ratio same as that of the exhaust gas flowing into the catalyst, i.e., a rich air-fuel ratio.

This means that the time lapsed when the air-fuel ratio of the downstream exhaust gas (i.e., the air-fuel ratio of the exhaust gas flowing out from the catalyst) becomes a rich air-fuel ratio since the air-fuel ratio of the upstream exhaust gas (i.e., the air-fuel ratio of the exhaust gas flowing into the catalyst) has changed from a lean air-fuel ratio to a rich air-fuel ratio is proportional to the amount of the $NO_X$ held in the $NO_X$ occluding and reducing catalyst.

The device in the '644 publication switches the air-fuel ratio of the upstream exhaust gas from a lean air-fuel ratio to a rich air-fuel ratio after the catalyst absorbs $NO_X$ to its maximum capacity and measures the time required for the downstream air-fuel ratio to change to a rich air-fuel ratio. Therefore, this measured time corresponds to a current maximum $NO_X$ absorbing capacity of the $NO_X$ occluding and reducing catalyst and can be used for determining the degree of deterioration of the $NO_X$ absorbing capacity of the catalyst.

International Patent Publication No. WO 94-17291 discloses an exhaust gas purification device similar to that of the '644 publication. The device in the '291 publication is also provided with a $NO_X$ occluding and reducing catalyst in the exhaust gas passage of an internal combustion engine and an air-fuel ratio sensor disposed in the exhaust gas passage downstream of the catalyst. When the engine is operated at a lean air-fuel ratio for a predetermined time, the device in the '291 publication switches the operating air-fuel ratio of the engine to a rich air-fuel ratio in order to release the absorbed $NO_X$ from the catalyst. The rich air-fuel ratio operation of the engine is continued until the air-fuel ratio of the exhaust gas detected by the air-fuel ratio sensor becomes a rich air-fuel ratio. When the detected air-fuel ratio changes a rich air-fuel ratio, the device stops the rich air-fuel ratio operation of the engine and returns to the lean air-fuel ratio operation of the engine. Namely, the device in the '291 publication determines that all the absorbed $NO_X$ has been released when the air-fuel ratio of the exhaust gas flowing out from the $NO_X$ occluding and reducing catalyst becomes a rich air-fuel ratio. Further, the device in the '291 publication also evaluates the deterioration of the $NO_X$ absorbing capacity of the $NO_X$ occluding and reducing catalyst based on the time required for the air-fuel ratio of the exhaust gas flowing out from the catalyst to change to a rich air-fuel ratio.

Though the device in the '291 publication stops the rich air-fuel ratio operation of the engine when a rich air-fuel ratio is detected by the air-fuel ratio sensor, this may cause worsening of the exhaust emission. Since the exhaust gas from the engine reaches the $NO_X$ occluding and reducing catalyst after a certain time required for travelling the exhaust gas passage, a lean air-fuel ratio exhaust gas does not reach the catalyst immediately after the engine operating air-fuel ratio is switched to a lean air-fuel ratio. Therefore, in the device in the '291 publication, a rich air-fuel ratio exhaust gas is supplied to the catalyst even after the catalyst has released all the absorbed $NO_X$. In this case, since $NO_X$ is not released from the catalyst, the rich air-fuel ratio exhaust gas containing HC and CO passes through the catalyst and HC and CO in the exhaust gas diffuses into the atmosphere. Further, the device in the '291 publication evaluates the $NO_X$ absorbing capacity of the $NO_X$ occluding and reducing catalyst based on the time required for the air-fuel ratio of the downstream exhaust gas to change to a rich air-fuel ratio after the engine operating air-fuel ratio is switched to a rich air-fuel ratio. This length of the time includes the time required for the exhaust gas to travel from the engine to the catalyst. The time required for the exhaust gas to travel from the engine to the catalyst changes in accordance with the engine operating conditions (for example, the velocity of the exhaust gas in the exhaust gas passage). Therefore, if the deterioration of the $NO_X$ absorbing capacity is determined based on the time required for the air-fuel ratio of the downstream exhaust gas to change to a rich air-fuel ratio after the engine operating air-fuel ratio is switched to a rich air-fuel ratio, the deterioration of the $NO_X$ absorbing capacity cannot be evaluated correctly.

A similar problem occurs in the device in the '644 publication since the device also evaluates the deterioration of the $NO_X$ absorbing capacity of the $NO_X$ occluding and reducing catalyst based on the time required for the air-fuel ratio of the downstream exhaust gas to change to a rich air-fuel ratio after the engine operating air-fuel ratio is switched to a rich air-fuel ratio.

Further, even if the $NO_X$ absorbing capacity is correctly evaluated, an ability of the $NO_X$ occluding and reducing catalyst including the ability as an oxidizing and reducing catalyst as well as the $NO_X$ absorbing capacity cannot be evaluated by the devices in the related arts. As explained later, the $NO_X$ occluding and reducing catalyst also acts as an oxidizing and reducing catalyst and this ability largely affects the reduction of $NO_X$ and oxidation of HC and CO. If the ability as the oxidizing and reducing catalyst of the $NO_X$ occluding and reducing catalyst deteriorates, $NO_X$ in the exhaust gas passes through the $NO_X$ occluding and reducing catalyst without reduced even though the $NO_X$ absorbing capacity thereof has not deteriorated. Therefore, it is necessary to evaluate the ability of the $NO_X$ occluding and reducing catalyst including both the ability as an oxidizing and reducing catalyst and the $NO_X$ absorbing capacity.

SUMMARY OF THE INVENTION

In view of the problems in the related art as set forth above, one of the objects of the present invention is to provide an exhaust gas purification device which is capable of evaluating the ability of a $NO_X$ occluding and reducing catalyst including the ability as an oxidizing and reducing catalyst as well as the $NO_X$ absorbing capacity.

Another object of the present invention is to provide an exhaust gas purification device which is capable of precisely evaluating the deterioration of the $NO_X$ absorbing capacity of the $NO_X$ occluding and reducing catalyst.

One or more of the objects as set forth above are achieved by an exhaust gas purification device including, according to the present invention, a $NO_X$ occluding and reducing catalyst disposed in the exhaust gas passage of an internal combustion engine and absorbing $NO_X$ in the exhaust gas when the air-fuel ratio of the exhaust gas flowing into the catalyst is at a lean air-fuel ratio and releasing and reducing the absorbed $NO_X$ when the air-fuel ratio of the exhaust gas flowing into the catalyst is at a stoichiometric or a rich air-fuel ratio, an air-fuel ratio sensor disposed in the exhaust gas passage downstream of the catalyst and detecting the air-fuel ratio of the exhaust gas flowing out from the catalyst, air-fuel ratio control means for switching the air-fuel ratio of the exhaust gas flowing into the catalyst from a rich air-fuel ratio to a lean air-fuel ratio, and evaluating means for evaluating the ability of the catalyst based on the length of the period where the air-fuel ratio of the exhaust gas flowing out from the catalyst is maintained at a stoichiometric air-fuel ratio after the air-fuel ratio of the exhaust gas flowing into the catalyst is switched from a rich air-fuel ratio to a lean air-fuel ratio by the air-fuel ratio control means.

In this aspect of the invention, contrary to the related arts, the ability of the $NO_X$ occluding and reducing catalyst is evaluated based on the time the air-fuel ratio of the exhaust gas flowing out from the catalyst is maintained at a stoichiometric air-fuel ratio after the air-fuel ratio of the exhaust gas flowing into the catalyst has changed from a rich air-fuel ratio to a lean air-fuel ratio. As explained before, the air-fuel ratio of the exhaust gas flowing out from the $NO_X$ occluding and reducing catalyst is maintained at a stoichiometric air-fuel ratio when the catalyst is releasing the absorbed $NO_X$. Further, it was found that the air-fuel ratio of the exhaust gas flowing out from the $NO_X$ occluding and reducing catalyst is also maintained at a stoichiometric air-fuel ratio for a certain period when the air-fuel ratio of the exhaust gas flowing into the catalyst is changed from a rich air-fuel ratio to a lean air-fuel ratio after all the $NO_X$ absorbed in the $NO_X$ occluding and reducing catalyst has been released.

The reason why the air-fuel ratio of the exhaust gas flowing out from the $NO_X$ occluding and reducing catalyst is maintained at a stoichiometric for a certain period after the air-fuel ratio of the exhaust gas flowing into the catalyst has changed to a rich air-fuel ratio is explained as follows.

When the air-fuel ratio of the exhaust gas flowing into the $NO_X$ occluding and reducing catalyst becomes a rich air-fuel ratio, HC and CO in the exhaust gas attaches to the surface of the catalytic components of the $NO_X$ occluding and reducing catalyst (such as platinum Pt). Since the $NO_X$ occluding and reducing catalyst also acts as an oxidizing catalyst, the HC and CO attached to the surface of the catalytic components are oxidized by reacting with $O_2$ in the exhaust gas when the air-fuel ratio of the exhaust gas flowing into the catalyst becomes a lean air-fuel ratio. Therefore, as long as the HC and CO on the surface of the catalytic components are oxidized by the $O_2$ in the exhaust gas, the air-fuel ratio of the exhaust gas flowing out from the $NO_X$ occluding and reducing catalyst does not become a lean air-fuel ratio even if the air-fuel ratio of the exhaust gas flowing into the catalyst is a lean air-fuel ratio. The period in which the air-fuel ratio of the exhaust gas flowing out from the $NO_X$ occluding and reducing catalyst is maintained at a stoichiometric air-fuel ratio becomes shorter as the ability of the catalytic components for oxidizing HC and CO becomes lower. Namely, the period becomes shorter as the ability of the $NO_X$ occluding and reducing catalyst as an oxidizing catalyst deteriorates. It is considered that the ability as a reducing catalyst also deteriorates as the ability as an oxidizing catalyst deteriorates. Therefore, the ability of the $NO_X$ occluding and reducing catalyst as an oxidizing and reducing catalyst can be evaluated based on the length of the period in which the air-fuel ratio of the exhaust gas flowing out from the catalyst after the air-fuel ratio of the exhaust gas flowing into the catalyst is changed from a rich air-fuel ratio to a lean air-fuel ratio. Thus, in this aspect of the invention, it becomes possible to evaluate the ability of the $NO_X$ occluding and reducing catalyst as an oxidizing and reducing catalyst.

According to one aspect of the invention there is provide an exhaust gas purification device for an engine comprising a $NO_X$ occluding and reducing catalyst disposed in the exhaust gas passage of an internal combustion engine and absorbing $NO_X$ in the exhaust gas when the air-fuel ratio of the exhaust gas flowing into the catalyst is at a lean air-fuel ratio and releasing and reducing the absorbed $NO_X$ when the air-fuel ratio of the exhaust gas flowing into the catalyst is at a stoichiometric or a rich air-fuel ratio, an air-fuel ratio sensor disposed in the exhaust gas passage downstream of the catalyst and detecting the air-fuel ratio of the exhaust gas flowing out from the catalyst, air-fuel ratio control means for changing the air-fuel ratio of the exhaust gas flowing into the catalyst from a lean air-fuel ratio to a rich air-fuel ratio and, after maintaining the rich air-fuel ratio for a predetermined period, from the rich air-fuel ratio to a lean air-fuel ratio, and evaluating means for evaluating the ability of the catalyst based on the manner of the changes in the air-fuel ratio of the exhaust gas flowing out from the catalyst when the air-fuel ratio of the exhaust gas flowing into the catalyst is changed from a lean air-fuel ratio to a rich air-fuel ratio and from a rich air-fuel ratio to a lean air-fuel ratio.

In this aspect of the invention, since the air-fuel ratio of the exhaust gas flowing into the $NO_X$ occluding and reducing catalyst is changed from a lean air-fuel ratio to a rich air-fuel ratio and from a rich air-fuel ratio to a lean air-fuel ratio. Therefore, when the air-fuel ratio of the exhaust gas flowing into the catalyst is changed from a lean air-fuel ratio to a rich air-fuel ratio, the $NO_X$ absorbing capacity can be evaluated and, when the air-fuel ratio of the exhaust gas flowing into is changed from a rich air-fuel ratio to a lean air-fuel ratio, the ability of the $NO_X$ occluding and reducing catalyst as an oxidizing and reducing catalyst can be evaluated. Thus, in this aspect of the invention, the ability of the $NO_X$ occluding and reducing catalyst including both the $NO_X$ absorbing capacity and the ability as an oxidizing and reducing catalyst can be evaluated.

According to another aspect of the invention there is provide an exhaust gas purification device for an engine comprising a $NO_X$ occluding and reducing catalyst disposed in the exhaust gas passage of an internal combustion engine and absorbing $NO_X$ in the exhaust gas when the air-fuel ratio of the exhaust gas flowing into the catalyst is at a lean air-fuel ratio and releasing and reducing the absorbed $NO_X$ when the air-fuel ratio of the exhaust gas flowing into the catalyst is at a stoichiometric or a rich air-fuel ratio, an air-fuel ratio sensor disposed in the exhaust gas passage downstream of the catalyst and detecting the air-fuel ratio of the exhaust gas flowing out from the catalyst, air-fuel ratio control means for changing the air-fuel ratio of the exhaust gas flowing into the catalyst from a rich air-fuel ratio to a predetermined lean air-fuel ratio, and evaluating means for evaluating the ability of the catalyst based on the amount of deviation of the air-fuel ratio of the exhaust gas flowing out from the catalyst from the predetermined lean air-fuel ratio after the air-fuel ratio of the exhaust gas flowing into the catalyst is changed to the predetermined lean air-fuel ratio by the air-fuel ratio control means.

In this aspect of the invention, the ability of the $NO_X$ occluding and reducing catalyst is evaluated based on the amount of deviation between the air-fuel ratios of the exhaust gases flowing into the catalyst and flowing out from the catalyst when the catalyst is absorbing $NO_X$ in the exhaust gas. As explained later, the $NO_X$ occluding and reducing catalyst uses $O_2$ in the exhaust gas when it absorbs $NO_X$ in the exhaust gas. Therefore, the concentration of $O_2$ in the exhaust gas flowing out from the $NO_X$ occluding and reducing catalyst becomes lower than the air-fuel ratio of the exhaust gas flowing into the catalyst when the catalyst absorbs $NO_X$. Namely, the air-fuel ratio of the exhaust gas flowing out from the $NO_X$ occluding and reducing catalyst becomes lower than the air-fuel ratio of the exhaust gas flowing into the catalyst when the catalyst is absorbing $NO_X$. The difference in the air-fuel ratios corresponds to the amount of $O_2$ used by the $NO_X$ occluding and reducing catalyst per unit time, i.e., the amount of $NO_X$ absorbed by the catalyst per unit time. When the $NO_X$ occluding and reducing catalyst absorbs $NO_X$ to the maximum capacity, since $NO_X$ in the exhaust gas is not absorbed in the catalyst any more, the air-fuel ratios of the exhaust gases flowing into and flowing out from the catalyst becomes the same. Therefore, the total amount of $NO_X$ absorbed by the $NO_X$ occluding and reducing catalyst can be calculated by integrating the difference in the air-fuel ratios of the exhaust gases flowing into and flowing from the catalyst. Thus, according to this aspect of the invention, the $NO_X$ absorbing capacity can be precisely evaluated.

According to another aspect of the invention there is provide an exhaust gas purification device for an engine comprising a $NO_X$ occluding and reducing catalyst disposed in the exhaust gas passage of an internal combustion engine and absorbing $NO_X$ in the exhaust gas when the air-fuel ratio of the exhaust gas flowing into the catalyst is at a lean air-fuel ratio and releasing and reducing the absorbed $NO_X$ when the air-fuel ratio of the exhaust gas flowing into the catalyst is at a stoichiometric or a rich air-fuel ratio, an air-fuel ratio sensor disposed in the exhaust gas passage downstream of the catalyst and detecting the air-fuel ratio of the exhaust gas flowing out from the catalyst, rich spike means for carrying out a rich spike operation for changing the air-fuel ratio of the exhaust gas flowing into the catalyst from a lean air-fuel ratio to a rich air-fuel ratio and, after maintaining the rich air-fuel ratio for a predetermined rich spike period, from the rich air-fuel ratio to a lean air-fuel ratio, evaluating means for evaluating the degree of deterioration of the catalyst based on an actual rich spike time and a reference rich spike time, wherein the actual rich spike time is defined by the time lapsed from the time where the air-fuel ratio of the exhaust gas flowing out from the catalyst becomes stoichiometric to the time where the air-fuel ratio of the exhaust gas flowing out from the catalyst becomes lower than a stoichiometric air-fuel ratio after the rich spike operation starts and the reference rich spike time is defined by the time required for a new $NO_x$ occluding and reducing catalyst to release the absorbed $NO_x$.

In this aspect of the invention, the rich spike means keeps the air-fuel ratio of the exhaust gas flowing into the $NO_x$ occluding and reducing catalyst at a rich air-fuel ratio for the predetermined period regardless of the change in the air-fuel ratio of the exhaust gas flowing out from the catalyst. The evaluating means evaluates the degree of deterioration of the $NO_x$ occluding and reducing catalyst based on the actual rich spike time and the reference rich spike time. The actual spike time is the length of the period in which the air-fuel ratio of the exhaust gas flowing out from the catalyst is maintained at a stoichiometric air-fuel ratio, i.e., the time actually required for a $NO_x$ occluding and reducing catalyst to release all the absorbed $NO_x$. The reference rich spike time is the time required for a new (not deteriorated) $NO_x$ occluding and reducing catalyst to release all the absorbed $NO_x$ under the condition the same as that when the actual rich spike time is measured, and is previously obtained by experiment. Since the actual rich spike time corresponds to the amount of $NO_x$ absorbed and held in the $NO_x$ occluding and reducing catalyst at the current degree of deterioration and the reference rich spike time corresponds to the amount of $NO_x$ absorbed and held in a new $NO_x$ occluding and reducing catalyst, the deterioration of the $NO_x$ occluding and reducing catalyst can be evaluated without being affected by the operating condition of the engine by comparing the actual rich spike time and the reference rich spike time.

BRIEF DESCRIPTION OF THE DRAWINGS

The present invention will be better understood from the description, as set forth hereinafter, with reference to the accompanying drawings in which:

FIGS. 3(A) and 3(B) are diagrams explaining another example of a method for evaluating the $NO_x$ absorbing capacity of the $NO_x$ occluding and reducing catalyst;

FIG. 4 shows a typical change in the amount of $NO_x$ absorbed in the $NO_x$ occluding and reducing catalyst per unit time in accordance with the change in the amount of $NO_x$ held in the catalyst;

FIG. 6 is a flowchart explaining a part of the evaluating operation of the ability of the $NO_x$ occluding and reducing catalyst;

FIGS. 20 and 21 are flowcharts explaining an example of the recovery operation of the $NO_x$ occluding and reducing catalyst.

DETAILED DESCRIPTION

Hereinafter, embodiments of the exhaust gas purification device according to the present invention will be explained with reference to FIGS. 1 through 21.

Figure 1:
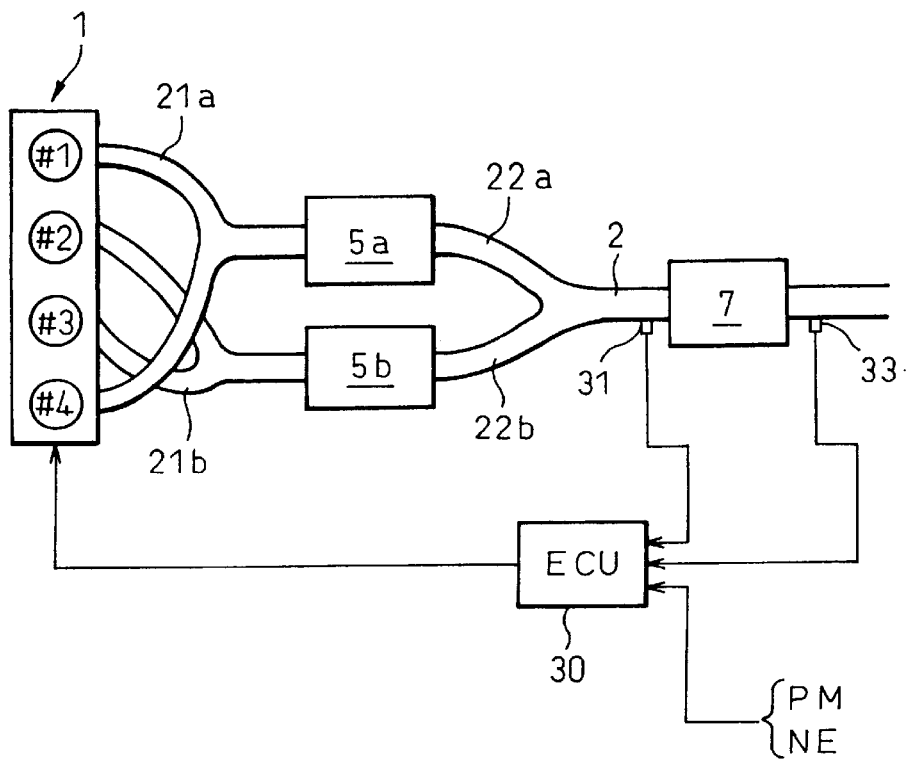
FIG. 1 schematically illustrates an embodiment of the exhaust gas purification device according to the present invention when it is applied to an internal combustion engine for an automobile.

FIG. 1 is a drawing schematically illustrating the general configuration of an embodiment of the present invention when it is applied to an internal combustion engine for an automobile.

In FIG. 1, reference numeral 1 represents an internal combustion engine for an automobile. In this embodiment, the engine 1 is an internal combustion engine (in this embodiment, the engine is a four-cycle four-cylinder engine having No. 1 through No. 4 cylinders). In this embodiment, the cylinders of the engine which are not in successive firing order form two groups of cylinders, and each group of cylinders is connected to a separate branch exhaust gas passage. Namely, since the firing order of the engine 1 is 1-3-4-2, the No. 1 and No. 4 cylinders are connected to a branch exhaust gas passage 22a via an exhaust gas manifold 21a and the No. 2 and No. 3 cylinders are connected to a branch exhaust gas passage 22b via an exhaust gas manifold 21b. On the respective branch exhaust gas passage, three-way catalysts 5a and 5b having relatively small capacities are disposed. The three-way catalyst 5a and 5b are capable of removing three pollutants in the exhaust gas, i.e., CO, HC and $NO_x$, at the same time when the air-fuel ratio of the exhaust gas flowing into the catalyst 5a and 5b is in a narrow range including the stoichiometric air-fuel ratio. The three-way catalyst 5a and 5b are capable of reducing $NO_x$ in the exhaust gas when the air-fuel ratio of the exhaust gas is lower than the above-noted range (i.e., when the air-fuel ratio is rich), and is capable of oxidizing HC and CO in the exhaust gas when the air-fuel ratio of the exhaust gas is higher than the above-noted range (i.e., when the air-fuel ratio is lean). The branch exhaust gas passages 22a and 22b merge into a common exhaust gas passage 2 downstream of the three-way catalysts 5a and 5b. On the common exhaust gas passage 2, a $NO_X$ occluding and reducing catalyst 7 is disposed. The $NO_X$ occluding and reducing catalyst 7 is explained later in detail.

In this embodiment, an upstream air-fuel ratio sensor 31 and a downstream air-fuel ratio sensor 33 are disposed in the common exhaust gas passage 2 at the inlet and outlet of the $NO_X$ occluding and reducing catalyst 7, respectively. The air-fuel ratio sensors 31 and 33 are linear air-fuel ratio sensors which generate continuous output signals having one-to-one correspondence with the air-fuel ratio of the exhaust gas.

Reference numeral 30 in FIG. 1 designates an electronic control unit (ECU) of the engine 1. The ECU 30 may be constructed as a microcomputer of a known type including a read-only memory (ROM), a random-access memory (RAM), a microprocessor (CPU) and input/output ports all connected to each other by a bi-directional bus. The ECU 30 performs basic control of the engine 1 such as a fuel injection control and an ignition control. Further, the ECU 30 in this embodiment acts as various means stated in the claims such as the air-fuel ratio control means and the evaluating means.

To facilitate these controls, air-fuel ratio signals from the upstream and downstream air-fuel ratio sensors 31 and 33 are supplied to the input port of the ECU 30 via an analog to digital (AD) converter (not shown). Further, signals representing the engine operating condition such as the speed of the engine 1 and the intake air pressure are supplied to the input port from various sensors (not shown). The output port of the ECU 30 is connected to the fuel injection valves and the ignition plugs of the respective cylinders of the engine in order to control the fuel injection amount, fuel injection timing and the ignition timing of the engine 1.

In this embodiment, the ECU 30 operates the engine 1 in the normal operation (i.e., when the evaluating operation of the ability of the $NO_X$ occluding and reducing catalyst is not performed) at a lean air-fuel ratio in most of the operating range, and performs rich spike operations periodically in order to operate the engine 1 at a rich air-fuel ratio for a short time.

Further, in the ability evaluating operation, the ECU 30 changes the operating air-fuel ratio of the engine from a lean air-fuel ratio to a predetermined target rich air-fuel ratio and, after maintaining the air-fuel ratio at the target rich air-fuel ratio for a predetermined period, returns the operating air-fuel ratio to a lean air-fuel ratio.

Next, the $NO_X$ occluding and reducing catalyst 7 will be explained.

The $NO_X$ occluding and reducing catalyst in this embodiment comprises precious metals such as platinum (Pt) rhodium (Rh), and at least one substance selected from alkali metals such as potassium (K), sodium (Na), lithium (Li) and cesium (Cs); alkali-earth metals such as barium (Ba) and calcium (Ca); and rare-earth metals such as lanthanum (La) and yttrium (Y). The $NO_X$ occluding and reducing catalyst absorbs $NO_X$ (nitrogen oxide) in the exhaust gas when the air-fuel ratio of the exhaust gas flowing into the catalyst is lean, and releases the absorbed $NO_X$ when the oxygen concentration of the exhaust gas flowing through the catalyst becomes low.

Though the mechanism of this absorbing and releasing operation of the $NO_X$ occluding and reducing catalyst is not clear at present, it is thought that the absorbing and releasing operation uses the following mechanism. Though the following mechanism of the absorbing and releasing operation of the $NO_X$ occluding and reducing catalyst is explained for the case where platinum Pt and barium Ba are used, as an example, it is thought that similar mechanisms also apply even if other precious metal, alkali metals, alkali earth metals, or rare earth metals are used.

Namely, when the concentration of $O_2$ in the exhaust gas increases, i.e., when the air-fuel ratio of the exhaust gas becomes lean, the oxygen $O_2$ in the exhaust gas is deposited on the surface of platinum Pt in the form of $O_2^-$ or $O^{2-}$. NO in the exhaust gas reacts with $O_2^-$ or $O^{2-}$ on the surface of the platinum Pt and becomes $NO_2$ by the reaction $2NO + O_2 \rightarrow 2NO_2$. Then, $NO_2$ in the exhaust gas and the $NO_2$ produced on the platinum Pt are further oxidized on the surface of platinum Pt and absorbed into the $NO_X$ occluding and reducing catalyst while bonding with barium oxide BaO and diffusing in BaO in the form of nitric acid ions $NO_3^-$. Thus, $NO_X$ in the exhaust gas is absorbed by the $NO_X$ occluding and reducing catalyst when the air-fuel ratio of the exhaust gas is lean.

On the other hand, when the oxygen concentration in the exhaust gas becomes low, i.e., when the air-fuel ratio of the exhaust gas becomes stoichiometric or rich, the production of $NO_2$ on the surface of the platinum Pt is lowered and the reaction proceeds in an inverse direction ($NO_3^- \rightarrow NO_2$), and thus nitric acid ions $NO_3^-$ in barium oxide BaO are released in the form of $NO_2$ from the $NO_X$ occluding and reducing catalyst.

In this case, if a reducing substance such as CO, or a substance such as HC and $CO_2$ exist in the exhaust gas, the released $NO_X$ is reduced on the platinum Pt by these components. Namely, the $NO_X$ occluding and reducing catalyst performs the absorbing and releasing operation of $NO_X$ in the exhaust gas in which $NO_X$ in the exhaust gas is absorbed by the $NO_X$ occluding and reducing catalyst when the air-fuel ratio of the exhaust gas is lean and, when the air-fuel ratio of the exhaust gas becomes stoichiometric or rich, $NO_X$ is released from the $NO_X$ occluding and reducing catalyst and reduced.

Since the $NO_X$ occluding and reducing catalyst absorbs and holds $NO_X$ therein in the form of nitric acid combined with absorbent such as BaO, the $NO_X$ occluding and reducing catalyst cannot absorb $NO_X$ when the absorbent is saturated with nitric acid ions. If the $NO_X$ occluding and reducing catalyst is saturated with nitric acid ions, $NO_X$ in the exhaust gas passes through the $NO_X$ occluding and reducing catalyst without being absorbed and diffuses into the atmosphere even if the air-fuel ratio of the exhaust gas is lean.

Therefore, in order to prevent the $NO_X$ occluding and reducing catalyst from being saturated with the absorbed $NO_X$, a rich spike operation is performed after the engine has been operated at a lean air-fuel ratio for a predetermined period. In the rich spike operation, the operating air-fuel ratio of the engine is switched to a rich air-fuel ratio and, after the rich air-fuel ratio operation of the engine is continued for a short period, again switched to the lean air-fuel ratio. Since the $NO_X$ absorbed in the $NO_X$ occluding and reducing catalyst is released and reduced during the rich air-fuel ratio operation, saturation of the $NO_X$ occluding and reducing catalyst with the absorbed $NO_X$ does not occur.

In this embodiment, the rich spike operation is carried out when the amount of the $NO_X$ absorbed in the $NO_X$ occluding and reducing catalyst reaches a predetermined value. In this case, since it is considered that the amount of the $NO_X$ absorbed in the $NO_X$ occluding and reducing catalyst is proportional to the length of a lean air-fuel ratio operation of the engine, the rich spike operation may be carried out when the engine is operated at a lean air-fuel ratio for a predetermined period. Further, it is considered that the amount of $NO_X$ absorbed in the $NO_X$ occluding and reducing catalyst is proportional to the amount of lean air-fuel ratio exhaust gas flowing into the catalyst, the rich spike operation may be carried out when the cumulative amount of the exhaust gas flowing into the catalyst reaches a predetermined value. In this case, a cumulative amount of the revolution of the engine may be used as a parameter representing the cumulative amount of the exhaust gas, and the rich spike operation may be carried out when the cumulative engine revolution reaches a predetermined value.

Further, since it is considered that the amount of the $NO_X$ absorbed in the $NO_X$ occluding and reducing catalyst is proportional to the cumulative amount of $NO_X$ in the exhaust gas flowing into the catalyst, the rich spike operation may be carried out when the cumulative amount of $NO_X$ in the exhaust gas flowing into the catalyst reaches a predetermined value. In this case, the relationship between the amount of $NO_X$ emitted from the engine per unit time (i.e., a $NO_X$ generation rate) and the engine operating condition (such as engine load and speed) are obtained previously by experiment and stored in the ROM of the ECU 30. During the lean air-fuel ratio operation of the engine, the ECU 30 calculates the $NO_X$ generation rate at predetermined intervals based on the engine operating condition, and carries out the rich spike operation when the cumulative value of the calculated $NO_X$ generation rate reaches a predetermined value.

In this embodiment, the interval between the rich spike operations is determined using one of the methods explained above.

The $NO_X$ occluding and reducing catalyst deteriorates for various reasons and, when the $NO_X$ occluding and reducing catalyst deteriorates, the capacity for absorbing $NO_X$ also decreases. For example, if the $NO_X$ occluding and reducing catalyst is exposed to a high temperature, the growth of the particles of the absorbent (such as barium oxide BaO) in the $NO_X$ occluding and reducing catalyst due to sintering occurs and the sizes of the particles become larger. The ability of the absorbent deteriorates and the maximum $NO_X$ absorbing capacity decreases as the sizes of the absorbent particles become larger. Therefore, in order to prevent the $NO_X$ occluding and reducing catalyst from being saturated with the absorbed $NO_X$, it is necessary to adjust the intervals between the rich spike operations in accordance with the degree of deterioration of the $NO_X$ occluding and reducing catalyst. Thus, it is important to evaluate the maximum $NO_X$ absorbing capacity (i.e., the degree of deterioration) of the $NO_X$ occluding and reducing catalyst.

Further, during the rich spike operation, the $NO_X$ released from the absorbent is reduced on the surface of the catalytic components (such as platinum Pt) of the $NO_X$ occluding and reducing catalyst. Therefore, when the ability of the catalytic components as a reducing catalyst deteriorates, the $NO_X$ released from the absorbent passes through the $NO_X$ occluding and reducing catalyst without being reduced even if the maximum $NO_X$ absorbing capacity of the $NO_X$ occluding and reducing catalyst has not deteriorated. Therefore, in order to prevent $NO_X$ from diffusing into the atmosphere, it is necessary to evaluate an ability of the $NO_X$ occluding and reducing catalyst including both the maximum $NO_X$ absorbing capacity and the ability as a reducing catalyst.

In this embodiment, an ability of the $NO_X$ occluding and reducing catalyst is evaluated by evaluating both the $NO_X$ absorbing capacity of the $NO_X$ occluding and reducing catalyst and the ability of the $NO_X$ occluding and reducing catalyst as a reducing catalyst using the method explained hereinafter.

First, the evaluation of the $NO_X$ absorbing capacity of the $NO_X$ occluding and reducing catalyst will be explained.

In this embodiment, the $NO_X$ absorbing capacity of the $NO_X$ occluding and reducing catalyst is evaluated by using the following two independent methods (A) and (B). In the following explanation, the term "the air-fuel ratio of the upstream exhaust gas" means the air-fuel ratio of the exhaust gas flowing into the $NO_X$ occluding and reducing catalyst and the term "the air-fuel ratio of the downstream exhaust gas" means the air-fuel ratio of the exhaust gas flowing out from the $NO_X$ occluding and reducing catalyst.

(A) A method based on the length of the period in which the air-fuel ratio of the downstream exhaust gas is maintained at a stoichiometric air-fuel ratio when the air-fuel ratio of the upstream exhaust gas is changed from a lean air-fuel ratio to a rich air-fuel ratio.

(B) A method based on the amount of the deviation of the air-fuel ratio of the downstream exhaust gas from the air-fuel ratio of the upstream exhaust gas after the air-fuel ratio of the upstream exhaust gas has been changed from a rich air-fuel ratio to a lean air-fuel ratio.

Figure 2A:
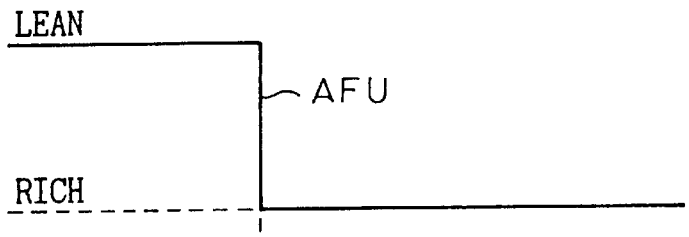
FIGS. 2(A) and 2(B) are diagrams explaining an example of a method for evaluating the $NO_x$ absorbing capacity of the $NO_x$ occluding and reducing catalyst.
Figure 2B:
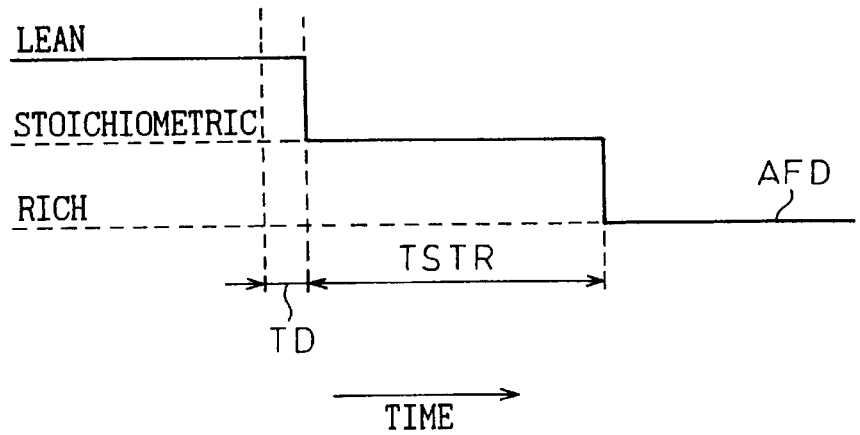

FIGS. 2(A) and 2(B) illustrate the evaluation by the above-noted method (A). FIG. 2(A) shows the change in the air-fuel ratio of the upstream exhaust gas detected by the upstream air-fuel ratio sensor 31 when the operating air-fuel ratio of the engine is changed from a lean air-fuel ratio to a rich air-fuel ratio. FIG. 2(B) shows the change in the air-fuel ratio of the downstream exhaust gas detected by the downstream air-fuel ratio sensor 33 in the same period as FIG. 2(A). After the air-fuel ratio of the upstream exhaust gas has been changed from a lean air-fuel ratio to a rich air-fuel ratio, the air-fuel ratio of the downstream exhaust gas is maintained at a stoichiometric air-fuel ratio during the period in which the $NO_X$ occluding and reducing catalyst 7 releases the absorbed $NO_X$ (FIG. 2(B)). The air-fuel ratio of the downstream exhaust gas changes from a stoichiometric air-fuel ratio to a rich air-fuel ratio only after the $NO_X$ occluding and reducing catalyst 7 releases all the absorbed $NO_X$. The length of the period in which the air-fuel ratio of the downstream exhaust gas is maintained at a stoichiometric air-fuel ratio (the period designated by TSTR in FIG. 2(B)) corresponds to the amount of $NO_X$ absorbed and held in the $NO_X$ occluding and reducing catalyst 7 during the lean air-fuel ratio operation. Therefore, the length of the period TSTR can be used as a parameter representing the $NO_X$ absorbing capacity of the $NO_X$ occluding and reducing catalyst 7. A delay TD in FIG. 2(B) represents a time required for the exhaust gas to flow from the position of the upstream air-fuel ratio sensor 31 to the position of the downstream air-fuel ratio sensor 33.

FIGS. 3(A) and 3(B) illustrate the evaluation by the above-noted method (B). FIGS. 3(A) and 3(B) show the changes in the air-fuel ratios of the upstream exhaust gas detected by the upstream air-fuel ratio sensor 31 and the downstream exhaust gas detected by the downstream air-fuel ratio sensor 33, respectively, when the operating air-fuel ratio of the engine is changed from a rich air-fuel ratio to a lean air-fuel ratio. In this case, it is assumed that the engine is operated at a rich air-fuel ratio for a period sufficiently long before the operating air-fuel ratio is changed to a lean air-fuel ratio so that the air-fuel ratio of the downstream exhaust gas has become a rich air-fuel ratio when the operating air-fuel ratio of the engine is switched to a lean air-fuel ratio.

As is seen from FIGS. 3(A) and 3(B), the air-fuel ratio of the downstream exhaust gas is maintained at a stoichiometric air-fuel ratio after the air-fuel ratio of the upstream exhaust gas has been changed to a lean air-fuel ratio also in this case. The period TD is a delay explained in FIG. 2(B). Further, though the air-fuel ratio of the downstream exhaust gas becomes a lean air-fuel ratio after it is maintained at a stoichiometric air-fuel ratio for a certain period, the air-fuel ratio of the downstream exhaust gas does not become the same as that of the upstream exhaust gas. As seen from FIG. 3(B), the air-fuel ratio of the downstream exhaust gas takes the value lower than the air-fuel ratio of the upstream exhaust gas, and gradually approaches the air-fuel ratio same as that of the upstream exhaust gas (FIG. 3(B), the period A). Namely, when the air-fuel ratio of the upstream exhaust gas is changed from a rich air-fuel ratio to a lean air-fuel ratio, the air-fuel ratio of the downstream exhaust gas deviates to a rich side from the air-fuel ratio of the upstream exhaust gas for a certain period.

It is considered that the deviation of the air-fuel ratio of the downstream exhaust gas is caused by the absorption of $NO_X$ in the exhaust gas by the $NO_X$ occluding and reducing catalyst 7. As explained before, $NO_X$ in the exhaust gas is absorbed in the absorbent BaO of the $NO_X$ occluding and reducing catalyst 7 in the form of a nitrate $Ba(NO_3)_2$ by the following reaction.

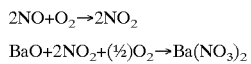

This means that the $NO_X$ occluding and reducing catalyst 7 uses (¾) moles of oxygen to absorb 1 mole of NO. Therefore, when the $NO_X$ occluding and reducing catalyst 7 absorbs $NO_X$ in the exhaust gas, the partial pressure of $O_2$ in the exhaust gas decreases since the $O_2$ in the exhaust gas is used by the $NO_X$ occluding and reducing catalyst 7. This causes the air-fuel ratio of the downstream exhaust gas to become lower (richer) than the air-fuel ratio of the upstream exhaust gas and the amount of the deviation DAF (difference between the air-fuel ratio of the downstream exhaust gas AFD and the air-fuel ratio of the upstream exhaust gas AFU) becomes a value proportional to the amount of $NO_X$ absorbed in the $NO_X$ occluding and reducing catalyst per unit time.

FIG. 4 shows the change in the absorption rate of $NO_X$ (the amount of $NO_X$ absorbed per unit time) of $NO_X$ occluding and reducing catalyst in accordance with the amount of $NO_X$ absorbed and held in the $NO_X$ occluding and reducing catalyst. The absorption rate of $NO_X$ decreases as the amount of $NO_X$ held in the $NO_X$ occluding and reducing catalyst increases, and becomes zero when the $NO_X$ occluding and reducing catalyst is saturated with the absorbed $NO_X$. Therefore, the length of the period A in FIG. 3(B), i.e., the time lapsed when the air-fuel ratio of the downstream exhaust gas becomes the same as the air-fuel ratio of the upstream exhaust gas represents the time required for the $NO_X$ occluding and reducing catalyst to be saturated with the absorbed $NO_X$. Thus, it will be understood that the cumulated value of the deviation DAF (i.e., the area of the hatched portion in FIG. 3(B)) is proportional to the maximum $NO_X$ absorbing capacity of the $NO_X$ occluding and reducing catalyst 7.

In this embodiment, the $NO_X$ absorbing capacity is first evaluated using the above-explained method (A) when the operating air-fuel ratio of the engine is changed from a lean air-fuel ratio to a rich air-fuel ratio, and evaluated again using the above-explained method (B) when the operating air-fuel ratio of the engine is returned to a lean air-fuel ratio from a rich air-fuel ratio. By evaluating the $NO_X$ absorbing capacity of the $NO_X$ occluding and reducing catalyst by changing the operating air-fuel ratio both from lean to rich and from rich to lean, the $NO_X$ absorbing capacity of the $NO_X$ occluding and reducing catalyst can be precisely evaluated.

Next, the evaluation of the catalytic ability (the ability as a reducing catalyst) of the $NO_X$ occluding and reducing catalyst is explained. In this embodiment, the catalytic ability is evaluated by, (C) the method based on the length of the period in which the air-fuel ratio of the downstream exhaust gas is maintained at a stoichiometric air-fuel ratio after the air-fuel ratio of the upstream exhaust gas has changed from a rich air-fuel ratio to a lean air-fuel ratio.

Figure 5A:
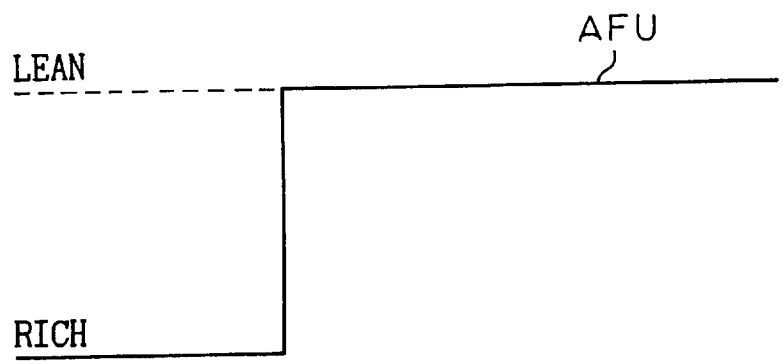
FIGS. 5(A) and 5(B) are diagrams explaining an example of a method for evaluating the ability of the $NO_x$ occluding and reducing catalyst as an oxidizing and reducing catalyst.
Figure 5B:
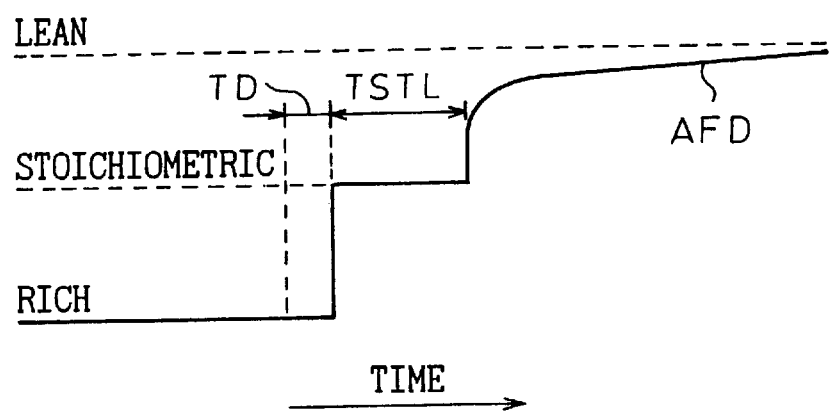

FIGS. 5(A) and 5(B) illustrate the evaluation of the catalytic ability by the above-noted method (C).

FIGS. 5(A) and 5(B) are similar diagrams as FIGS. 3(A) and 3(B) which show the changes in the air-fuel ratios of the upstream exhaust gas detected by the upstream air-fuel ratio sensor 31 and the downstream exhaust gas detected by the downstream air-fuel ratio sensor 33, respectively, when the operating air-fuel ratio of the engine is changed from a rich air-fuel ratio to a lean air-fuel ratio. In this case, the engine was also operated at a rich air-fuel ratio for a sufficiently long period before the operating air-fuel ratio is changed to a lean air-fuel ratio so that the air-fuel ratio of the downstream exhaust gas has become a rich air-fuel ratio when the operating air-fuel ratio of the engine is switched to a lean air-fuel ratio.

When the air-fuel ratio of the upstream exhaust gas is changed from a rich air-fuel ratio to a lean air-fuel ratio, the air-fuel ratio of the downstream exhaust gas, after the delay time TD has lapsed, changes to a stoichiometric air-fuel ratio and stays there for a certain period (TSTL in FIG. 5(B)). The reason why the air-fuel ratio of the downstream exhaust gas is maintained at a stoichiometric air-fuel ratio for a certain period when the air-fuel ratio of the upstream exhaust gas changes from a rich air-fuel ratio to a lean air-fuel ratio is explained as follows.

When a sufficient time has lapsed after the air-fuel ratio of the upstream exhaust gas was changed to a rich air-fuel ratio, all the $NO_X$ absorbed in the $NO_X$ occluding and reducing catalyst are released. In this condition, HC and CO attaches to the surfaces of the catalytic components of the $NO_X$ occluding and reducing catalyst in place of $O_2^-$ or $O^{2-}$. Therefore, when the air-fuel ratio of the exhaust gas flowing into the $NO_X$ occluding and reducing catalyst changes to a lean air-fuel ratio, the HC and CO attached to the surface of the catalytic component are oxidized by $O_2$ in the exhaust gas. Since $O_2$ in the exhaust gas is used for oxidizing HC, CO on the surface of the catalytic components, the air-fuel ratio of the exhaust gas flowing out from the catalyst becomes a stoichiometric air-fuel ratio. The length of the period (TSTL in FIG. 5(B)) corresponds to the amount of HC and CO oxidized on the surfaces of the catalytic components, i.e., the ability of the $NO_X$ occluding and reducing catalyst as an oxidizing catalyst. Since the ability of the $NO_X$ occluding and reducing catalyst as a reducing catalyst deteriorates as the ability as an oxidizing catalyst deteriorates, the time TSTL can be used as a parameter representing the ability of the $NO_X$ occluding and reducing catalyst as a reducing catalyst.

Therefore, in this embodiment, the ability of the $NO_X$ occluding and reducing catalyst including the $NO_X$ absorbing capacity and the catalytic ability as a reducing catalyst is evaluated using the above explained methods (A), (B) and (C). Namely, when the operating air-fuel ratio of the engine is switched to a rich air-fuel ratio after operating the engine at a lean air-fuel ratio for a predetermined time, the $NO_X$ absorbing capacity is evaluated by the above-explained method (A). After the evaluation by the method (A) is completed, the operating air-fuel ratio is again changed to a lean air-fuel ratio and the evaluation of the catalytic ability by the method (C) is carried out. Further, the evaluation of the $NO_X$ absorbing capacity by the method (B) is carried out after the evaluation by the method (C) is completed.

The evaluation of the ability of the $NO_X$ occluding and reducing catalyst will be explained in detail with reference to FIGS. 6 to 12.

FIG. 6 is a flowchart illustrating a basic operation for evaluating the ability of the $NO_X$ occluding and reducing catalyst according to the present embodiment. This operation is performed by a routine executed by the ECU 30 at predetermined intervals.

In FIG. 6, at step 601, parameters representing the engine operating condition and the exhaust gas condition (such as the engine speed NE, intake airflow GA, the degree of opening TH of the throttle valve, the target value AFT of the engine operating air-fuel ratio and the temperature $T_{CAT}$ of the $NO_X$ occluding and reducing catalyst 7) are read from the respective sensors. The temperature $T_{CAT}$ of the $NO_X$ occluding and reducing catalyst 7 may be directly detected by a temperature sensor disposed in the catalyst bed of the $NO_X$ occluding and reducing catalyst 7 or may be estimated from the exhaust gas temperature and exhaust gas flow (further, the exhaust gas temperature and flow may be calculated from the engine load condition using the engine speed NE and the intake airflow GA).

At step 603, the amount GNOX of the $NO_X$ currently held in the $NO_X$ occluding and reducing catalyst 7 is read in. As explained before, the amount GNOX is calculated based on the cumulative value of the engine revolutions or the cumulated amount of the $NO_X$ emitted from the engine.

At step 605, it is determined whether the value of the evaluating operation flag XD is set at 1. XD is set to 1 at step 613 when the conditions for performing the evaluating operation of the ability of the $NO_X$ occluding and reducing catalyst 7 are satisfied and set to 0 at step 1217 in FIG. 12 when the evaluating operation is completed. If XD=0 at step 605, the operation determines whether the conditions for performing the evaluating operation are satisfied at step 607. At step 607, if the engine speed NE, intake air amount GA and the degree of opening of the throttle valve TH are all stable and within predetermined ranges, and if the temperature $T_{CAT}$ of the $NO_X$ occluding and reducing catalyst 7 is within a predetermined range, it is determined that the conditions for performing the evaluating operation are satisfied.

If the conditions are satisfied at step 607, the value of the flag XD is set to 1 at step 613. When the flag XD is set to 1, the evaluating operation of the $NO_X$ occluding and reducing catalyst 7 is performed as explained later, and steps 607 to 613 are not performed unless the value of the flag XD is reset to 0.

If the conditions in step 607 are not satisfied, steps 609 and 611 are performed. Steps 609 and 611 are steps for performing the rich spike operation. Namely, at step 609, it is determined whether GNOX, the amount of $NO_X$, reaches a predetermined value A, and if GNOX≧A, a rich spike flag FR is set to 1 at step 611. When the flag FR is set at 1, the operating air-fuel ratio of the engine 1 is changed to a lean air-fuel ratio for a short period by a routine executed by the ECU 30, and the $NO_X$ absorbed in the $NO_X$ occluding and reducing catalyst is released and reduced.

As explained above, the basic operation in FIG. 6 starts the evaluating operation when the conditions are satisfied, and performs the rich spike operation in accordance with the amount of $NO_X$ absorbed and held in the $NO_X$ occluding and reducing catalyst when the conditions for the evaluating operation are not satisfied.

Figure 7:
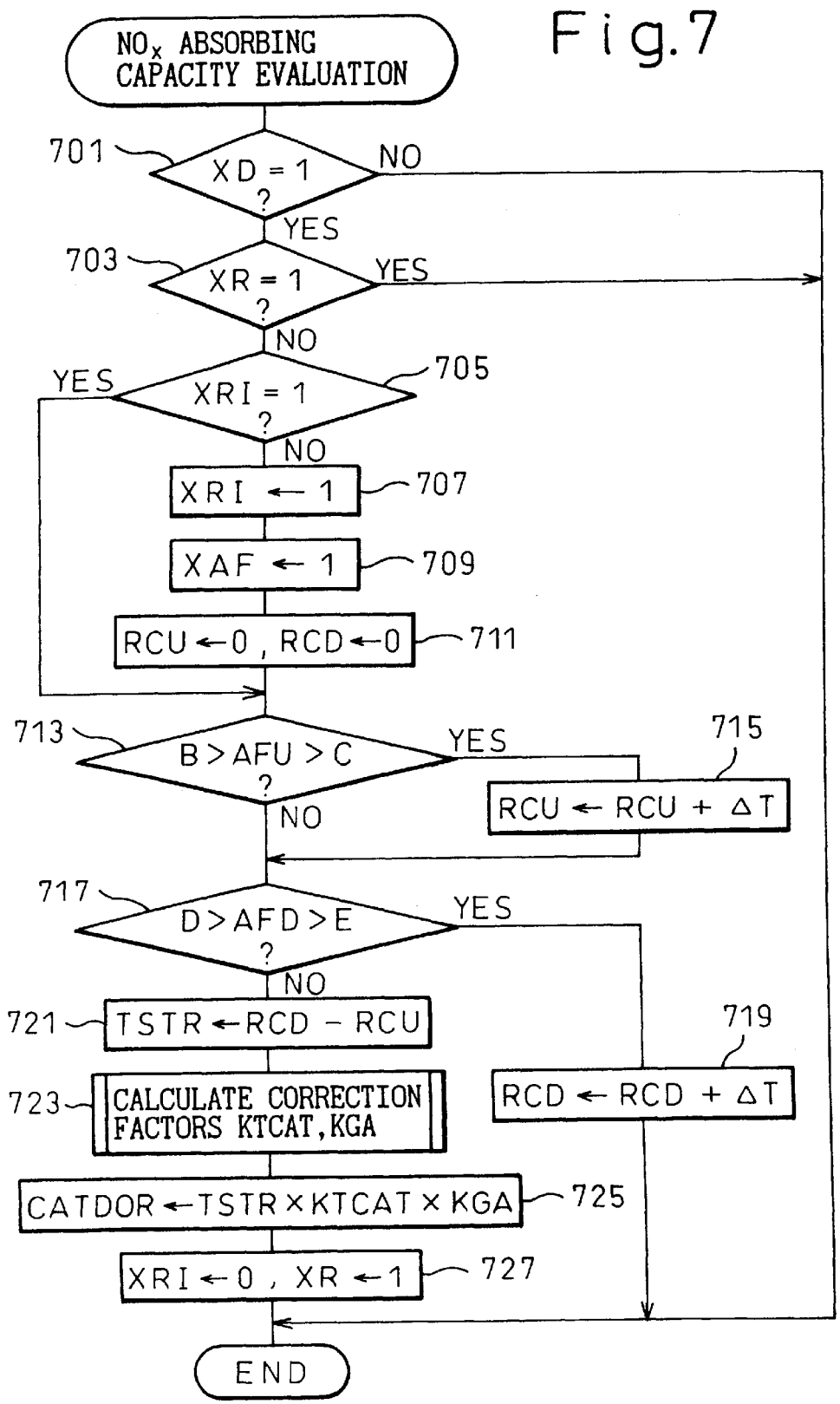
FIG. 7 is a flowchart explaining a part of the evaluating operation of the ability of the $NO_x$ occluding and reducing catalyst.

Next, FIG. 7 is a flowchart illustrating the evaluating operation of the $NO_X$ absorbing capacity based on the method (A) as explained before. This operation is performed by a routine performed by the ECU 30 at regular intervals.

In the operation in FIG. 7, the $NO_X$ absorbing capacity of the $NO_X$ occluding and reducing catalyst 7 is evaluated by calculating the time TSTR in FIG. 2(B), i.e., the length of the period in which the air-fuel ratio of the downstream exhaust gas is maintained at a stoichiometric air-fuel ratio after the air-fuel ratio of the upstream exhaust gas was changed from a rich air-fuel ratio to a lean air-fuel ratio.

In FIG. 7, at step 701, the operation determines whether the evaluating operation flag XD is set at 1. If XD≠1 at step 701, since this means that the conditions for performing the evaluating operation are not satisfied, the operation terminates immediately. If XD=1 at step 701, the operation determines whether a flag XR is set at 1 at step 703. XR is a completion flag which is set to 1 at step 727 when the evaluating operation in FIG. 7 is completed. If XR=1 at step 703, the operation terminates immediately. Namely, the operation in FIG. 7 is performed only once when the conditions for performing the evaluating operation are satisfied. If XR≠1 at step 703, the operation determines whether a flag XRI is set at 1. XRI is a flag used to perform steps 709 and 711 only once when XR≠1 at step 703. If XRI≠1 at step 705, flag XRI is set to 1 at step 707 and a rich air-fuel ratio operation flag XAF is set to 1 at step 709. Further, the values of counters RCU and RCD are both cleared. When the rich air-fuel ratio operation flag XAF is set to 1, the fuel injection amount of the engine 1 is adjusted by a fuel injection routine performed by the ECU 30 so that the operating air-fuel ratio of the engine becomes a predetermined rich air-fuel ratio.

Next, at step 713, it is determined whether the air-fuel ratio AFU of the upstream exhaust gas detected by the upstream air-fuel ratio sensor 31 is within a predetermined range between B and C. The range B–C is a relatively narrow air-fuel ratio range around the stoichiometric air-fuel ratio, i.e., at step 713, it is determined whether the air-fuel ratio of the upstream exhaust gas is in a narrow range around the stoichiometric air-fuel ratio. If the air-fuel ratio of the upstream exhaust gas is within a narrow range around the stoichiometric air-fuel ratio, the value of the counter RCU is increased by ΔT at step 715. AT is a interval at which the operation in FIG. 7 is carried out. Therefore, the value of the counter RCU represents the length of the period in which the air-fuel ratio of the upstream exhaust gas is maintained within a narrow air-fuel ratio range around the stoichiometric air-fuel ratio. Steps 717 and 719 are operation similar to those of steps 713 and 715. Namely, by performing steps 717 and 719, the value of the counter RCD represents the period in which the air-fuel ratio of the downstream exhaust gas is maintained within a narrow range around the stoichiometric air-fuel ratio. AFD in step 717 is the air-fuel ratio of the downstream exhaust gas detected by the downstream air-fuel ratio sensor 33 and the air-fuel ratio range D–E is a narrow range around the stoichiometric air-fuel ratio.

After calculating the length of the period in which the air-fuel ratio of the downstream exhaust gas is maintained near the stoichiometric air-fuel ratio, if the air-fuel ratio of the downstream exhaust gas deviates from the air-fuel ratio range D–E, step 721 is performed. At step 721, the length of the period TSTR in FIG. 2(B) is calculated by TSTR=RCD−RCU. The reason why TSTR is obtained by subtracting RCU from RCD is that the air-fuel ratio of the upstream exhaust gas becomes the stoichiometric air-fuel ratio for a short period due to the $O_2$ storage capability of the three-way catalyst 5a and 5b when the operating air-fuel ratio of the engine is changed from a lean air-fuel ratio to a rich air-fuel ratio. It is necessary to measure TSTR from the time when the air-fuel ratio of the upstream exhaust gas changes from the stoichiometric to a rich air-fuel ratio. Therefore, the true value of TSTR is calculated by subtracting RCU from RCD.

Figure 8:
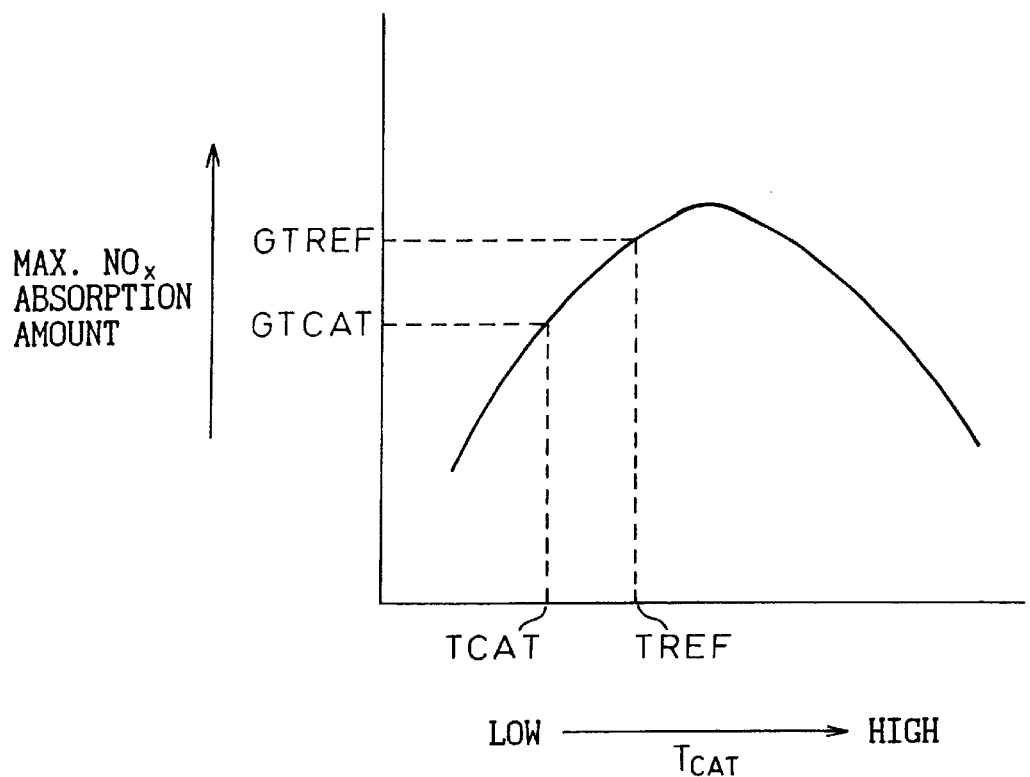
FIG. 8 is a chart showing the values of a temperature correction factor used in the operation in FIG. 7.

As explained before, the time TSTR corresponds to the $NO_X$ absorbing capacity of the $NO_X$ occluding and reducing catalyst. However, the value of TSTR changes in accordance with the conditions of the exhaust gas (for example, temperature of the exhaust gas) even though the $NO_X$ absorbing capacity of the $NO_X$ occluding and reducing catalyst is the same. FIG. 8 is a diagram illustrating the change in the maximum $NO_X$ absorbing capacity of a new (not deteriorated) $NO_X$ occluding and reducing catalyst in accordance with the temperature $T_{CAT}$ of the $NO_X$ occluding and reducing catalyst. As is seen from FIG. 8, the maximum $NO_X$ absorbing capacity largely changes when the temperature $T_{CAT}$ changes. Since the time TSTR corresponds to the maximum $NO_X$ absorbing capacity under the current catalyst temperature $T_{CAT}$, the calculated value of TSTR must be converted to the value under a reference catalyst temperature in order to evaluate the $NO_X$ absorbing capacity of the $NO_X$ occluding and reducing catalyst.

In this embodiment, a reference $NO_X$ absorbing capacity GTCAT of a new $NO_X$ occluding and reducing catalyst at the temperature $T_{CAT}$ and another reference $NO_X$ absorbing capacity GTREF of a new $NO_X$ occluding and reducing catalyst at a reference temperature TREF (refer to FIG. 8) are used for correcting the calculated TSTR. Since the $NO_X$ absorbing capacity of a new $NO_X$ occluding and reducing catalyst is GTCAT at the temperature $T_{CAT}$ and GTREF at the temperature TREF, the $NO_X$ absorbing capacity of the present $NO_X$ occluding and reducing catalyst at the reference temperature TREF can be calculated by TSTR×(GTREF/GTCAT). Therefore, a temperature correction factor KTCAT is calculated by the values GTREF and GTCAT obtained from FIG. 8 by KTCAT=GTREF/GTCAT.

Further, the time TSTR also changes in accordance with the air-fuel ratio and the flow rate of the exhaust gas flowing into the $NO_X$ occluding and reducing catalyst. When the air-fuel ratio of the exhaust gas is low, or the flow rate of the exhaust gas is high, the amount of HC and CO flowing into the $NO_X$ occluding and reducing catalyst per unit time becomes large. Therefore, in this case, the amount of $NO_X$ released from the catalyst per unit time also becomes large. Namely, the time TSTR becomes shorter as the air-fuel ratio of the exhaust gas becomes lower or the flow rate of the exhaust gas becomes higher even though the amount of $NO_X$ absorbed in the catalyst is the same. In this embodiment, since the air-fuel ratio of the upstream exhaust gas is maintained at a predetermined rich air-fuel ratio when the rich operation flag XAF is set at 1, it is not necessary to consider the difference in the air-fuel ratio of the exhaust gas. However, since the flow rate of the exhaust gas changes in accordance with the operating condition of the engine, it is necessary to correct the calculated value of TSTR in accordance with the flow rate of the exhaust gas.

Figure 9:
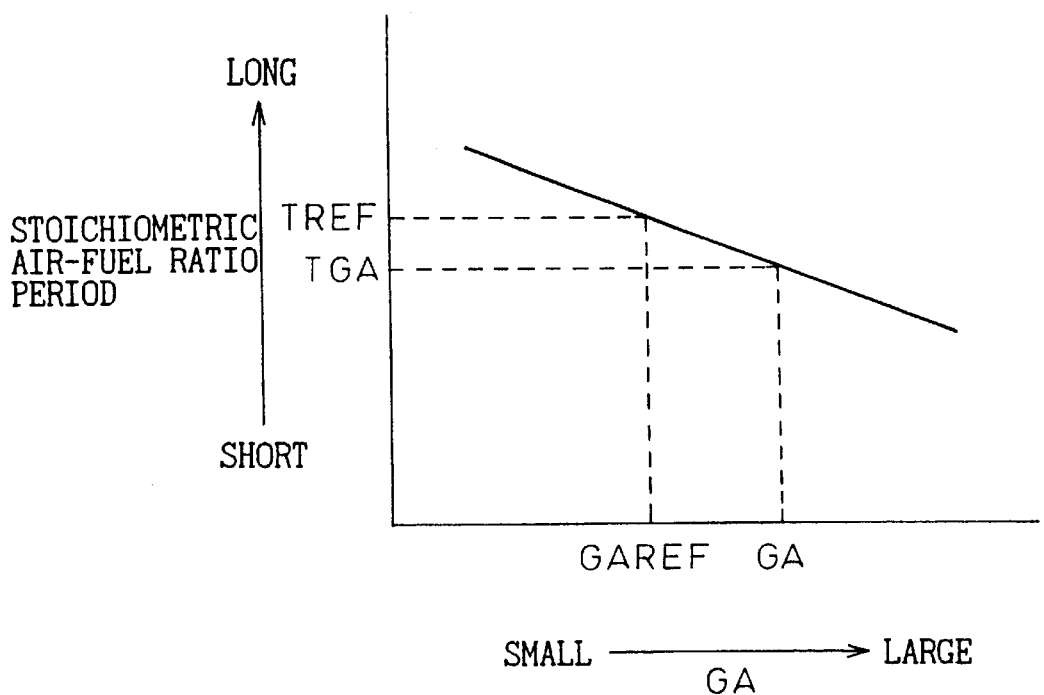
FIG. 9 is a chart showing the values of a flow rate correction factor used in the operation in FIG. 7.

FIG. 9 is a diagram showing the change in the time TSTR of a new $NO_X$ occluding and reducing catalyst in accordance with the flow rate of the exhaust gas (i.e., the flow rate GA of the intake air). As is seen from FIG. 9, the time TSTR becomes shorter as the flow rate GA increases. In this embodiment, the flow rate correction factor KGA is calculated in the same manner as that of the temperature correction factor KTCAT, i.e., by KGA=TREF/TGA. TREF is the value of TSTR of a new $NO_X$ occluding and reducing catalyst when the flow rate is a reference value GAREF and TGA is the value of TSTR of a new $NO_X$ occluding and reducing catalyst under the current flow rate GA.

In FIG. 7, step 723, the temperature correction factor KTCAT and the flow rate correction factor KGA are calculated based on the relationship in FIGS. 8 and 9, and the corrected value CATDOR of the TSTR is calculated by CATDOR=TSTR×KTCAT×KGA at step 725.

After calculating CATDOR at step 725, the values of the flag XRI and XR are set to 1 to indicate that the evaluating operation in FIG. 7 is completed and, when the operation is next performed, the operation terminates immediately after step 703.

Figure 10:
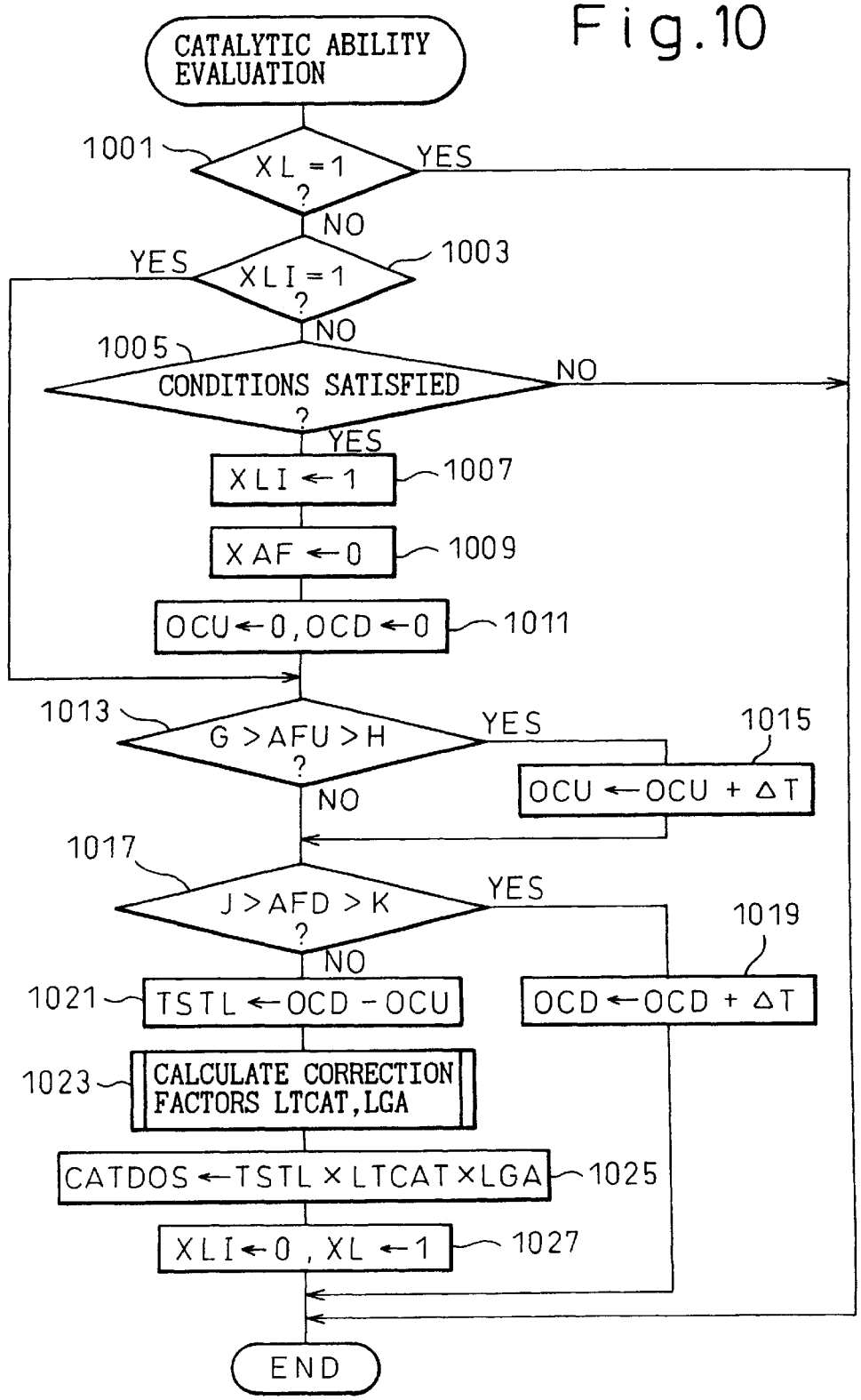
FIG. 10 is a flowchart explaining a part of the evaluating operation of the ability of the $NO_x$ occluding and reducing catalyst.

FIG. 10 is a flowchart showing the evaluating operation of the catalytic ability of the $NO_X$ occluding and reducing catalyst based on the method (C) as explained before. This operation is performed by a routine executed by the ECU 30 at regular intervals.

In this operation, the catalytic ability is evaluated when the operating air-fuel ratio is changed from a rich air-fuel ratio to a lean air-fuel ratio after the evaluating operation in FIG. 7 was completed.

In FIG. 10, at steps 1001 and 1003, it is determined whether the values of the flags XL and XLI are set at 1. XL is a flag representing whether the evaluation of the catalytic ability is completed. The flag XL has a function similar to that of the flag XR in FIG. 7. Further, the XLI is a flag having a function similar to that of the flag XRI in FIG. 7, i.e., the function for performing steps 1005 to 1011 only once.

At step 1005, it is determined whether the conditions for performing the evaluating operation are satisfied. The conditions determined at step 1005 are, (a) the value of the flag XD is set at 1 and, (b) the value of the flag XR is set at 1, i.e., the evaluating operation in FIG. 7 has been completed.

If both conditions are satisfied at step 1005, the flag XLI is set to 1 at step 1007 and the flag XAF is set to 0 at step 1009. When the flag XAF is set to 0, the fuel injection amount of the engine 1 is adjusted by the fuel injection routine separately performed by the ECU 30 so that the operating air-fuel ratio of the engine 1 becomes a predetermined lean air-fuel ratio. Further, at step 1011, the values of counters OCU and OCD are cleared. The counters OCU and OCD are the counters having functions the same as those of the counters RCU and RCD in FIG. 7.

Steps 1013 to 1027 are the operations similar to those of steps 713 to 727 in FIG. 7. The air-fuel ratio ranges G–H in step 1013 and J–K in step 1017 are narrow ranges around the stoichiometric air-fuel ratio. TSTL in step 1021 is the length of the period in which the air-fuel ratio of the downstream exhaust gas is maintained at the stoichiometric air-fuel ratio and, LTCAT, LGA (step 1023) are a temperature correction factor and a flow rate correction factor similar to KTCAT and KGA in FIG. 7. LTCAT and LGA are determined based on the relationships similar to FIGS. 8 and 9.

By the operation in FIG. 10, the catalytic ability of the $NO_X$ occluding and reducing catalyst 7 CATDOS is obtained at step 1025 in the manner similar to the operation in FIG. 7.

Figure 11:
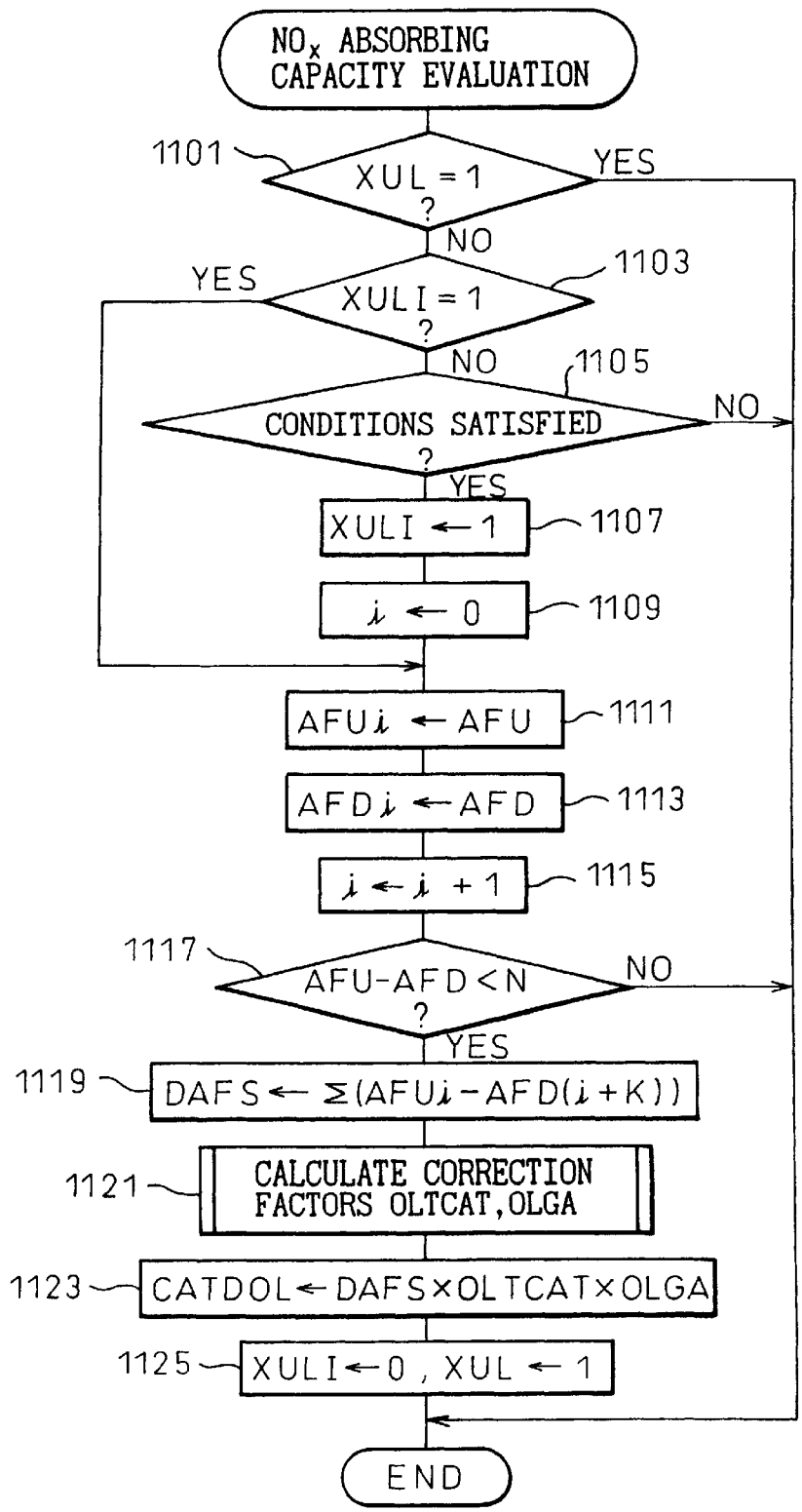
FIG. 11 is a flowchart explaining a part of the evaluating operation of the ability of the $NO_x$ occluding and reducing catalyst.

FIG. 11 is a flowchart illustrating the evaluating operation of the $NO_X$ absorbing capacity of the $NO_X$ occluding and reducing catalyst 7 based on the method (B) explained before. This operation is carried out by a routine executed by the ECU 30 at regular intervals. In this operation, the $NO_X$ absorbing capacity is obtained by calculating the cumulative value of the difference between the air-fuel ratios of the upstream and downstream exhaust gas. The calculated cumulative value is also corrected in accordance with the exhaust gas conditions.

In FIG. 11, steps 1101 through 1109 are operations similar to steps 1001 through 1011 in FIG. 10 except that XUL in step 1101 is a flag representing that the evaluating operation in FIG. 11 has been completed and that the conditions in step 1105 for performing the evaluating operation include XL=1 in addition to XD=1 and XR=1. Namely, the evaluating operation in FIG. 11 is performed after the evaluating operations in FIGS. 7 and 10 have been completed. Further, in this operation, a counter i (step 1109) is used for calculating the cumulative value of the difference in the air-fuel ratios of the upstream and downstream exhaust gas.

In this operation, the air-fuel ratio of the upstream exhaust gas AFU and the air-fuel ratio of the downstream exhaust gas AFD are stored in RAM as AFUi and AFDi at steps 1111 and 1113, respectively. The value of i is increased by 1 every time the operation is carried out (step 1115). At step 1117, the difference between AFU and AFD is compared with a predetermined value N (N is a small constant value). If (AFU−AFD)<N at step 1117, this means that the $NO_X$ occluding and reducing catalyst will not absorb $NO_X$ any longer and the cumulative value DAFS of the deviation of the air-fuel ratio of the downstream exhaust gas from the air-fuel ratio of the upstream exhaust gas is calculated at step 1119. In this embodiment, considering the delay time TD (FIG. 3) caused by the movement of the exhaust gas between the air-fuel ratio sensors 31 and 33, the deviation is defined as (AFUi−AFD(i+k)). Namely, it is assumed that the exhaust gas passing the upstream air-fuel ratio sensor 31 reaches the downstream air-fuel ratio sensor 33 after the operation in FIG. 11 is performed k times. The value of k may be changed in accordance with the operating condition (such as exhaust gas velocity in the exhaust gas passage).

After calculating the cumulative value DAFS (i.e., the area of the hatched portion in FIG. 3(B)), the operation calculates a temperature correction factor OLTCAT and a flow rate correction factor OLGA at step 1121. The correction factors OLTCAT and OLGA are calculated based on the relationships similar to those in FIGS. 8 and 9. The $NO_X$ absorbing capacity CATDOL of the $NO_X$ occluding and reducing catalyst 7 is calculated by CATDOL=DAFS× OLTCAT×OLGA.

Further, in this embodiment, the ability of the $NO_X$ occluding and reducing catalyst 7 is determined based on CATDOR, CATDOS and CATDOL obtained by the evaluating operations in FIGS. 7, 10 and 11.

Figure 12:
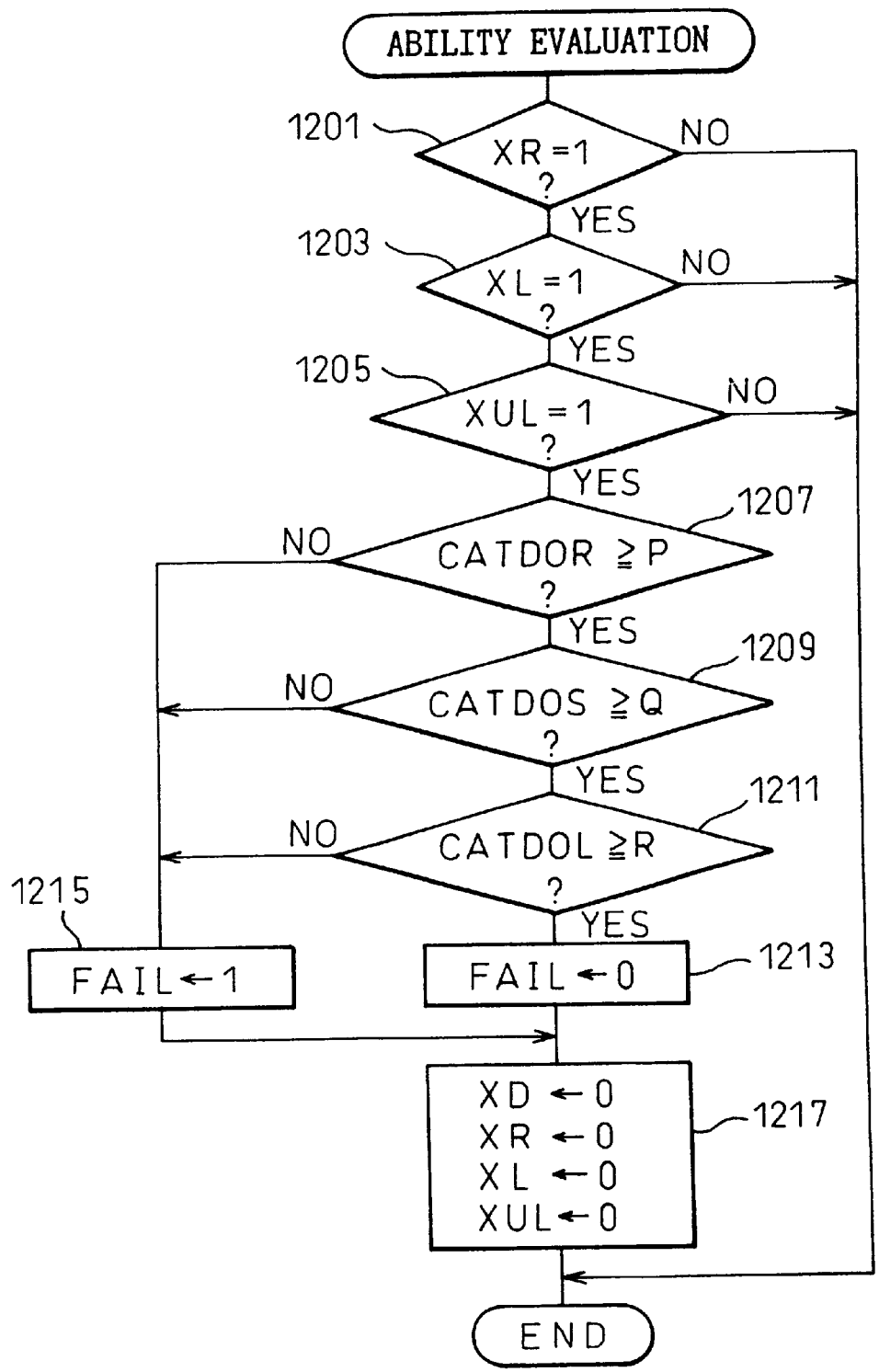
FIG. 12 is a flowchart explaining a part of the evaluating operation of the ability of the $NO_x$ occluding and reducing catalyst.

FIG. 12 is a flowchart for determining the ability of the $NO_X$ occluding and reducing catalyst. This operation is performed by a routine executed by the ECU 30 at predetermined intervals.

In FIG. 12, at steps 1201 through 1205, it is determined whether the evaluating operations of FIGS. 7, 10 and 11 have been completed based on the values of the flags XR, XL and XUL. If any of these operations has not been completed, the operation in FIG. 12 terminates without determining the ability of the $NO_X$ occluding and reducing catalyst 7.

If all of the evaluating operations in FIGS. 7, 10 and 11 have been completed, this operation determines whether the $NO_X$ absorbing capacity CATDOR evaluated by the operation in FIG. 7 is not smaller than a predetermined reference value P at step 1207. Similarly, at steps 1209 and 1211, it is determined whether the catalytic ability CATDOS evaluated by the operation in FIG. 10 and the $NO_X$ absorbing capacity CATDOL evaluated by the operation in FIG. 11 are not smaller than the reference values Q and R, respectively. If none of CATDOR, CATDOS, CATDOL is smaller than the reference values at steps 1207 through 1211, the value of a failure flag FAIL is set to 0 at step 1213. If any of CATDOR, CATDOS and CATDOL is smaller than the reference value, the value of the failure flag FAIL is set to 1 at step 1215. After setting the value of the flag FAIL, the values of the flags XD, XR, XL and XU are all reset to 0 in order to indicate that the evaluation of the ability has been completed. Further, if the failure flag FAIL is set to 1, the ECU 30 activates an alarm in order to warn the driver that the $NO_X$ occluding and reducing catalyst has deteriorated.

According to the present embodiment, since the $NO_X$ absorbing capacity of the $NO_X$ occluding and reducing catalyst is evaluated when the air-fuel ratio of the upstream exhaust gas changes to both directions (i.e., from lean to rich and from rich to lean), the $NO_X$ absorbing capacity is precisely evaluated. Further, according to the present embodiment, the catalytic ability of the $NO_X$ occluding and reducing catalyst as well as the $NO_X$ absorbing capacity can be evaluated by one changing operation of the operating air-fuel ratio of the engine and the evaluation of the ability of the $NO_X$ occluding and reducing catalyst including both the $NO_X$ absorbing capacity and the catalytic ability can be performed.

Figure 13:
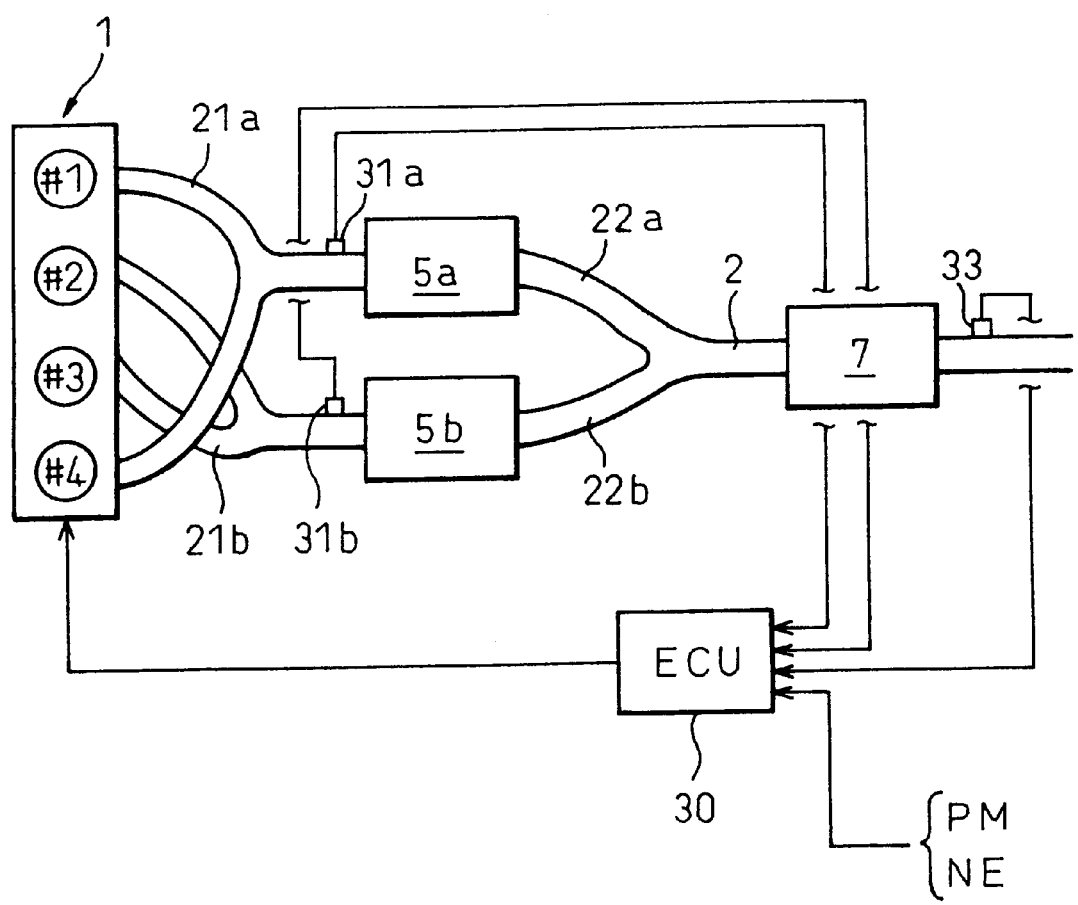
FIG. 13 schematically illustrates another embodiment of the exhaust gas purification device according to the present invention.
Figure 14:
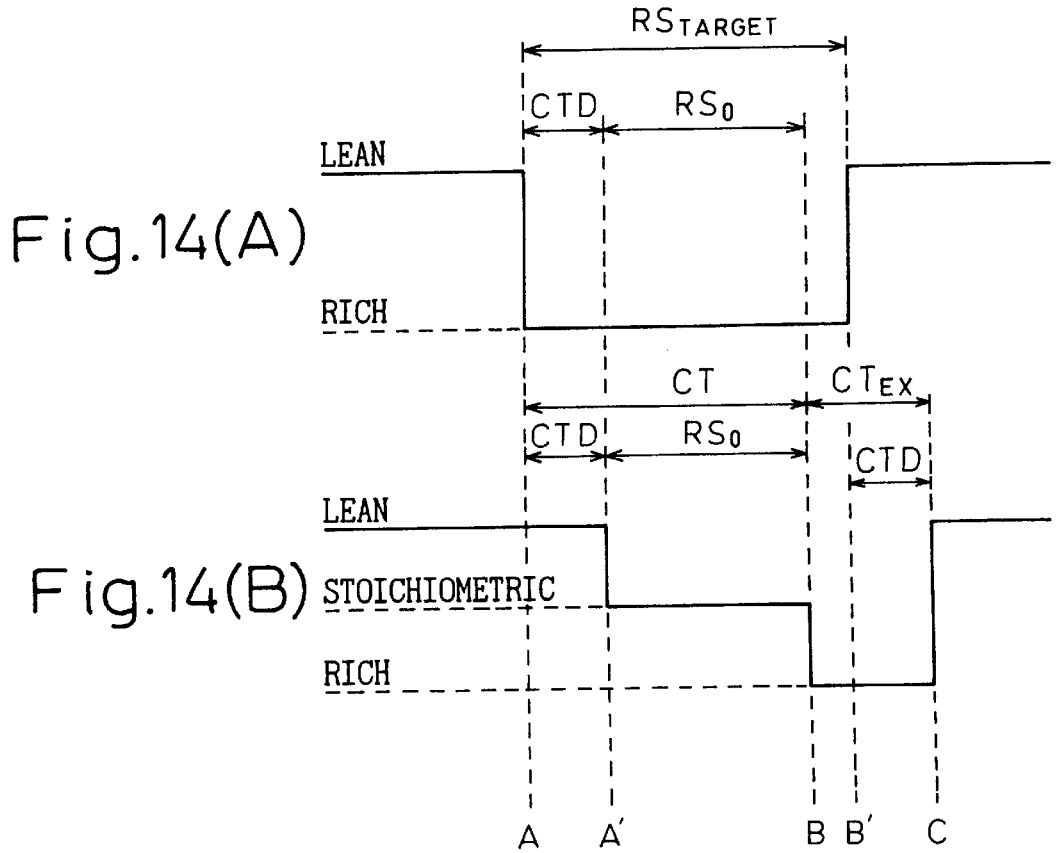
FIGS. 14(A) and 14(B) are diagrams explaining an example of a method for evaluating the degree of deterioration of the $NO_x$ occluding and reducing catalyst.

Next, another embodiment of the present invention will be explained. In this embodiment, the arrangement of the exhaust gas purification device may be the same as that in FIG. 1. However, in this embodiment, since the upstream air-fuel ratio sensor is less important, the upstream air-fuel ratio sensor may be disposed at a portion different from the air-fuel ratio sensor 31 in FIG. 1. For example, instead of one upstream air-fuel ratio sensor 31 in FIG. 1, two upstream air-fuel ratio sensors 31a and 31b may be disposed in the branch exhaust gas passage upstream of the three-way catalyst 5a and 5b as illustrated in FIG. 13. Further, an $O_2$ sensor which generates a signal of different level according to whether the exhaust gas air-fuel ratio is a lean air-fuel ratio or a rich air-fuel ratio, instead of the linear air-fuel ratio sensor in FIG. 1 may be used as the upstream and downstream air-fuel ratio sensors.

In this embodiment, the ECU 30 evaluates the $NO_X$ absorbing capacity of the $NO_X$ occluding and reducing catalyst, i.e., the degree of deterioration of the $NO_X$ occluding and reducing catalyst, and adjusts the length of the rich air-fuel ratio operation period in the rich spike operation and/or the interval between the rich spike operations in accordance with the degree of deterioration of the $NO_X$ occluding and reducing catalyst.

In this embodiment, the degree of deterioration, i.e., the $NO_X$ absorbing capacity of the $NO_X$ occluding and reducing catalyst 7 is evaluated during the rich spike operation in a manner similar to the method (A) in the previous embodiment.

FIGS. 14(A) and 14(B) are diagrams similar to FIGS. 2(A) and 2(B) illustrating the change in the operating air-fuel ratio of the engine and the air-fuel ratio of the downstream exhaust gas detected by the downstream air-fuel ratio sensor 33 during the rich spike operation.

In this embodiment, the length of the rich operation period in the rich spike operation is set at a constant value $RS_{TAR\text{-}GET}$ regardless of the air-fuel ratio of the downstream exhaust gas when evaluating the degree of deterioration of the $NO_X$ occluding and reducing catalyst 7. As is seen from FIGS. 14(A) and 14(B), when the operating air-fuel ratio of the engine is switched to a rich air-fuel ratio at the beginning of the rich spike operation (point A in FIG. 14(B)), the air-fuel ratio of the downstream exhaust gas is maintained at a lean air-fuel ratio until the rich air-fuel ratio exhaust gas arrives the $NO_X$ occluding and reducing catalyst (a delay period CTD in FIGS. 14(A) and 14(B)). When the delay time CTD has lapsed, the air-fuel ratio of the downstream exhaust gas changes to a stoichiometric air-fuel ratio (point A' in FIG. 14(B)) and stays there for a period $RS_0$ before it changes to a rich air-fuel ratio at point B in FIG. 14(B). As explained before, the length of the period $RS_0$ is the actual time required for the $NO_X$ occluding and reducing catalyst to release all the $NO_X$ it has absorbed. This time is hereinafter referred to as "an actual rich spike time". Further, when the rich spike operation ends at the point B' in FIG. 14(B), the air-fuel ratio of the downstream exhaust gas is maintained at a rich air-fuel ratio until the delay time CTD has lapsed after the rich spike operation has ended (the point C in FIG. 14(B)). Therefore, since the rich spike operation period $RS_{TARGET}$ is longer than the actual rich spike time $RS_0$ in FIGS. 14(A) and 14(B), the rich spike operation period $RS_{TARGET}$ is in excess of actually required rich spike time RSO by $CT_{EX}$.

As explained before, the actual rich spike time $RS_0$ corresponds to the current $NO_X$ absorbing capacity of the $NO_X$ occluding and reducing catalyst 7. However, the time $RS_0$ changes in accordance with the engine operating conditions such as exhaust gas temperature and flow rates even though the $NO_X$ absorbing capacity of the $NO_X$ occluding and reducing catalyst and the rich air-fuel ratio during the rich spike operation are the same. Therefore, in this embodiment, a reference rich spike time $RS_{REF}$ which is a time required for a new (not deteriorated) $NO_X$ occluding and reducing catalyst to release all the absorbed $NO_X$ under the current operating conditions of the engine is used for evaluating the degree of deterioration of the $NO_X$ occluding and reducing catalyst. By comparing the actual rich spike time $RS_0$ and the reference rich spike time $R_{REF}$, the degree of deterioration of the $NO_X$ occluding and reducing catalyst can be precisely evaluated regardless of the engine operating conditions.

Figure 15:
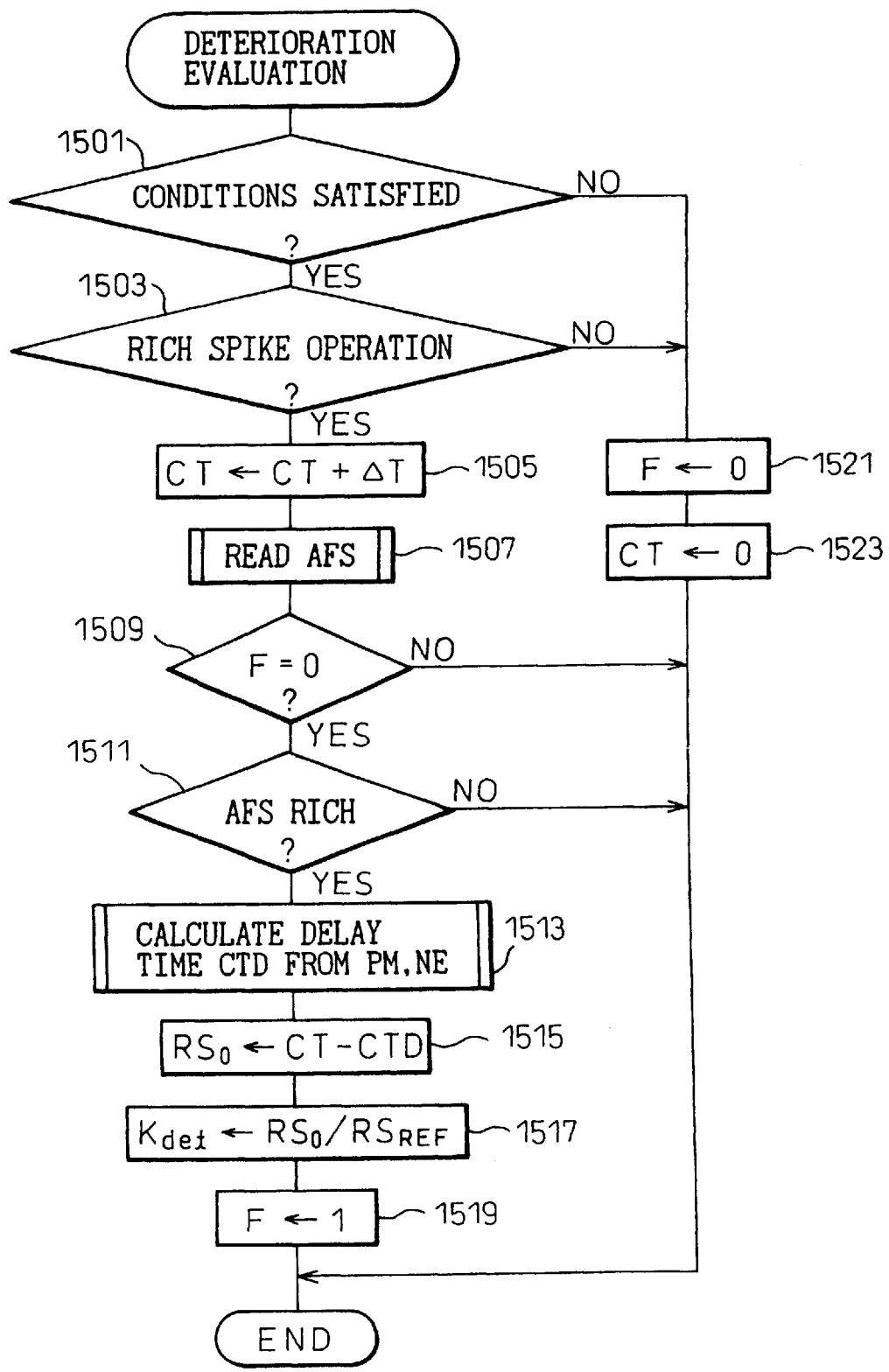
FIG. 15 is a flowchart explaining an example of the evaluating operation of the degree of deterioration of the $NO_x$ occluding and reducing catalyst.

FIG. 15 is a flowchart explaining the evaluating operation of the degree of deterioration of the $NO_X$ occluding and reducing catalyst in this embodiment.

Step 1501 in FIG. 15 designates the determination whether the conditions for evaluation of the deterioration is satisfied. The conditions determined at step 1501 are, for example, (a) that the engine operating condition is stable, i.e., the engine load and engine speed are constant and (b) that the recovery operation (explained later) is not in progress. If one or more of the conditions (a) and (b) is not satisfied, the operation terminates after setting the value of a flag F to 0 at step 1521 and clearing the value of a counter CT at step 1523. The flag F indicates whether the evaluating operation in FIG. 15 has been completed, and F=0 means that the evaluating operation is not completed.

If both conditions (a) and (b) are satisfied at step 1501, it is determined whether the rich spike operation is not in progress at step 1503, and if the rich spike operation is not in progress, the operation terminates after executing steps 1521 and 1523. If the rich spike operation is in progress at step 1503, the value of the counter CT is increased by ΔT at step 1505. ΔT is the interval at which this operation is performed. Since the counter CT is reset to 0 at step 1523 when the rich spike operation is not performed, the value of the counter CT at step 1505 agrees with the time that has lapsed after the rich spike operation was started. At step 1507, the air-fuel ratio of the downstream exhaust gas AFS is read from the downstream air-fuel ratio sensor 33 and, at step 1509, it is determined whether the value of the flag F is 0. If F≠0 at step 1509, the operation terminates without executing steps 1511 through 1519. Namely, the evaluating operation is performed only once after the conditions in step 1501 were satisfied.

If F=0 at step 1509, it is determined whether the air-fuel ratio of the downstream exhaust gas AFS is at a rich air-fuel ratio. As explained in FIG. 14(B), when the rich spike operation is performed, the air-fuel ratio of the downstream exhaust gas AFS becomes a rich air-fuel ratio after the delay time CTD has lapsed, and stays at the rich air-fuel ratio until all the absorbed $NO_X$ is released from the $NO_X$ occluding and reducing catalyst 7. Step 1511 monitors the AFS in order to determine the changing point (the point B in FIG. 14(B)) to the rich air-fuel ratio. If AFS is not a rich air-fuel ratio at step 1511, this means that absorbed $NO_X$ still remains in the $NO_X$ occluding and reducing catalyst and the operation terminates without executing steps 1513 through 1519. If AFS is rich at step 1511, i.e., if all the absorbed $NO_X$ has been released from the $NO_X$ occluding and reducing catalyst, the time $RS_0$ (FIG. 14(B)) is calculated at steps 1513 and 1515. Namely, the delay time CTD is calculated at step 1513 and $RS_0$ is calculated by $RS_0$=CT−CTD at step 1515. The delay time CTD is the time required for the exhaust gas to flow from the engine 1 to the position of the downstream air-fuel ratio sensor 33. This delay time changes in accordance with the engine load and speed (i.e., the velocity of the exhaust gas in the exhaust gas passage). In this embodiment, the relationship between the delay time CTD and the engine operating conditions (i.e., the engine load and speed) is previously obtained by experiment, and stored in the ROM of the ECU 30 in the form of a numerical table using the engine intake air pressure PM (i.e., the engine load) and the engine speed NE as parameters. At step 1513, the delay time CTD is read from the numerical table using the current engine operating condition (PM and NE).

After calculating the time $RS_0$, a deterioration factor $K_{det}$ which represents the degree of deterioration of the $NO_X$ occluding and reducing catalyst is calculated based on the actual rich spike time $RS_0$ and the reference rich spike time $RS_{REF}$ by $K_{det}$=$RS_0$/$RS_{REF}$ at step 1517 and, at step 1519, the value of the flag F is set to 1 in order to indicate that the evaluation of the degree of deterioration of the $NO_X$ occluding and reducing catalyst (i.e., the calculation of the factor $K_{det}$ has been completed).

Figure 16:
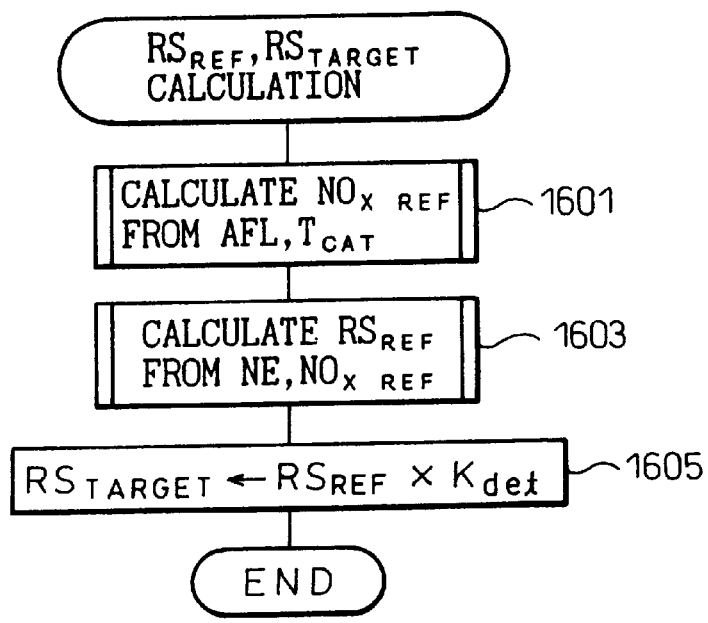
FIG. 16 is a flowchart explaining the calculation of the reference rich spike time.

The reference rich spike time $RS_{REF}$ is the time corresponding to $RS_0$ when a new $NO_X$ occluding and reducing catalyst is used under the current engine operating condition, and obtained by the operation in FIG. 16. The time $RS_0$ corresponds to the amount of $NO_X$ absorbed in the $NO_X$ occluding and reducing catalyst 7 under the current engine operating conditions, i.e., the maximum $NO_X$ absorbing capacity of the catalyst 7. The time $RS_{REF}$ corresponds to the maximum $NO_X$ absorbing capacity of a new $NO_X$ occluding and reducing catalyst under the current engine operating conditions. Therefore, the ratio $K_{det}$=$RS_0$/$RS_{REF}$ corresponds to the degree of deterioration of the $NO_X$ occluding and reducing catalyst 7.

Next, the calculation of the reference rich spike time $RS_{REF}$ and the setting of the rich spike period $RS_{TARGET}$ (FIG. 14(A)) will be explained with reference to the flowchart in FIG. 16.

In FIG. 16, at step 1601, the maximum amount of $NO_X$ absorbed and held by a new (not deteriorated) $NO_X$ occluding and reducing catalyst (i.e., the reference $NO_X$ amount $NO_{Xref}$) under the current temperature $T_{CAT}$ of the actual $NO_X$ occluding and reducing catalyst 7 and the air-fuel ratio of the exhaust gas AFL during the current lean air-fuel ratio operation of the engine 1 is calculated. The maximum amount of $NO_X$ absorbed and held by the $NO_X$ occluding and reducing catalyst changes in accordance with the air-fuel ratio of the lean air-fuel ratio operation and the temperature of the catalyst. The reference $NO_X$ amount $NO_{Xref}$ is previously obtained by experiment in which the maximum amount of $NO_X$ absorbed by a new $N_X$ occluding and reducing catalyst is measured under various air-fuel ratio and temperature conditions. The reference $NO_X$ amount $NO_{Xref}$ is stored in the ROM of the ECU 30 in the form of a numerical table using the AFL (the air-fuel ratio of the exhaust gas during the lean air-fuel ratio operation of the engine) and the temperature $T_{CAT}$ of the $NO_X$ occluding and reducing catalyst as parameters. At step 1601, the reference $NO_X$ amount $NO_{Xref}$ is read from the numerical table based on the current temperature $T_{CAT}$ of the catalyst 7 and the air-fuel ratio AFL of the exhaust gas during the current lean air-fuel ratio operation.

Figure 17:
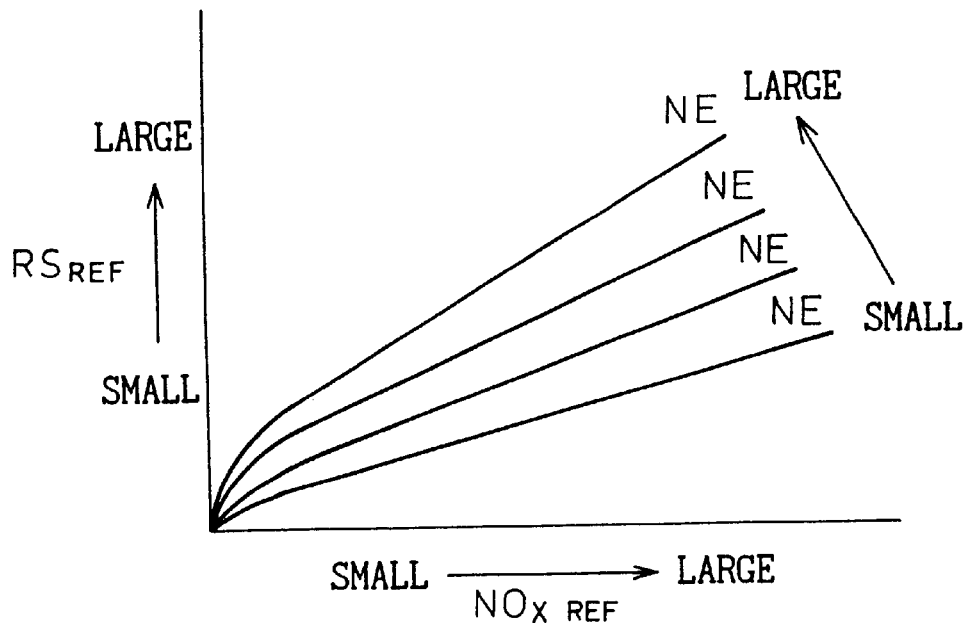
FIG. 17 is a chart illustrating the change in the reference rich spike time in accordance with the change in the operating condition of the engine.

At step 1603 in FIG. 16, the reference rich spike time $RS_{REF}$ which is required for a new $NO_X$ occluding and reducing catalyst to release the reference $NO_X$ amount $NO_{Xref}$ obtained at step 1601 is calculated. The reference rich spike time $R_{REF}$ also changes in accordance with the flow rate of the exhaust gas even if the $NO_X$ amount $NO_{Xref}$ is the same. For example, when the flow rate of the exhaust gas is low, the time $R_{REF}$ becomes longer even if the amount $NO_{Xref}$ is the same. FIG. 17 shows the relationship between the time $RS_{REF}$ and the amount $NO_{Xref}$ when the engine speed NE changes. In FIG. 17, the engine speed NE is used as a parameter representing the exhaust gas flow rate since the exhaust gas flow rate changes in accordance with the engine speed.

At step 1603 in FIG. 16, the reference rich spike time $RS_{REF}$ is obtained from the relationship in FIG. 17 based on the reference $NO_X$ amount and the engine speed NE. The obtained value of $RS_{REF}$ is used for calculating the factor $K_{det}$ in the operation in FIG. 15.

Further, the length of the rich spike operation ($RS_{TARGET}$ in FIG. 14(A)) is set in accordance with the calculated reference rich spike time $RS_{REF}$ and the deterioration factor $K_{det}$ by $RS_{TARGET}=RS_{REF} \times K_{det}$ at step 1605. Since the factor $K_{det}$ represents the ratio of the actual $NO_X$ absorbing capacity of the $NO_X$ occluding and reducing catalyst 7 and the reference $NO_X$ amount $NO_{Xref}$, the time required for the current $NO_X$ occluding and reducing catalyst 7 to release all the absorbed $NO_X$ can be obtained by multiplying the reference rich spike time $RS_{REF}$ by the deterioration factor $Kd_{det}$. When the rich spike period $RS_{TARGET}$ is calculated at step 1605, the length of the rich air-fuel ratio operation of the engine during the rich spike operation is set to $RS_{TARGET}$ calculated at step 1605. Therefore, the length of the period of the rich air-fuel ratio operation during the rich spike operation matches the amount of $NO_X$ actually absorbed in the $NO_X$ occluding and reducing catalyst 7, and the excess rich air-fuel ratio operation such as the period $CT_{EX}$ in FIG. 14(B) is eliminated.

Though only the rich spike operation period $RS_{TARGET}$ is adjusted in accordance with the degree of the deterioration $K_{det}$ in FIG. 16, since the maximum $NO_X$ absorbing capacity of the $NO_X$ occluding and reducing catalyst becomes smaller as the degree of deterioration becomes larger, it is preferable to adjust the interval between the rich spike operations in accordance with the deterioration of the $NO_X$ occluding and reducing catalyst. In this embodiment, therefore, the interval between the rich spike operations is adjusted so that the interval becomes proportional to the value $K_{det}$. For example, if the rich spike operation is performed at a regular interval $T_0$, the interval may be adjusted by multiplying To by the factor $K_{det}$. Further, if the rich spike operation is performed when the cumulative value of the engine speed NE or the estimated value of the amount of $NO_X$ absorbed in the catalyst reaches predetermined values, the predetermined values may be adjusted by multiplying the factor $K_{det}$. By adjusting the interval between the rich spike operations, the saturation of the $NO_X$ occluding and reducing catalyst with the absorbed $NO_X$ can be effectively prevented.

Next, the relationship between the deterioration of the $NO_X$ occluding and reducing catalyst and the performance (the ability for purifying $NO_X$ in the exhaust gas) of the whole exhaust gas purification device will be explained.

As explained above, the factor $K_{det}$ represents the degree of the deterioration of the $NO_X$ occluding and reducing catalyst, i.e., the $NO_X$ absorbing capacity of the $NO_X$ occluding and reducing catalyst. However, even if the $NO_X$ absorbing capacity of the $NO_X$ occluding and reducing catalyst deteriorates to some extent, the performance (the ability for purifying $NO_X$ in the exhaust gas) of the exhaust gas purification device as a whole does not deteriorate, provided the rich spike operation (for example, the rich spike period and the interval between the rich spike operation) is adjusted in accordance with the degree of deterioration in the manner explained above.

Figure 18:
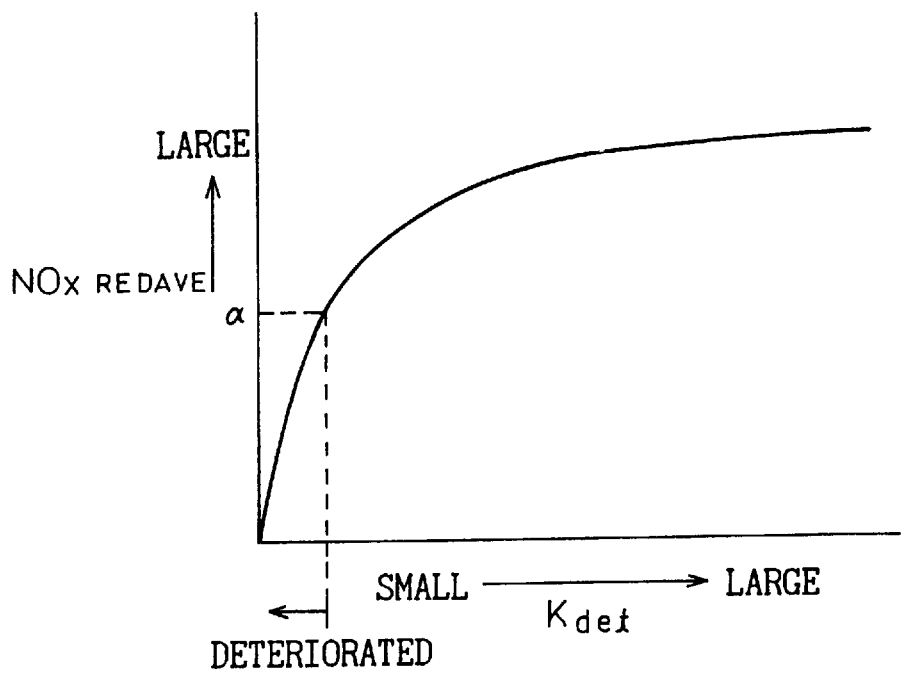
FIG. 18 is a diagram explaining the relationship between the $NO_x$ purification performance as a total system and the deterioration of the $NO_x$ occluding and reducing catalyst.

FIG. 18 shows the change in the performance $NO_{XREDAVE}$ of the whole exhaust gas purification device in accordance with the degree of deterioration of the $NO_X$ occluding and reducing catalyst $K_{det}$. As is seen from FIG. 18, when the degree of deterioration is small (i.e., $K_{det}$ is large), the performance (the $NO_X$ purification ability) $NO_{XREDAVE}$ of the device does not change largely even if the deterioration of the catalyst proceeds (i.e., $K_{det}$ becomes smaller).

However, when the value of $K_{det}$ becomes smaller than a certain value, the performance $NO_{XREDAVE}$ of the device falls rapidly as the deterioration of the $NO_X$ occluding and reducing catalyst proceeds. Therefore, the allowable limit of the deterioration of the $NO_X$ occluding and reducing catalyst must be determined based on the performance of the device as a whole. In this embodiment, therefore, the $NO_X$ occluding and reducing catalyst is determined as having deteriorated beyond the allowable limit when the purification performance of the whole device $NO_{XREDAVE}$ becomes lower than the reference value $\alpha$ in FIG. 18.

Further, when the $NO_X$ occluding and reducing catalyst is determined as having deteriorated, recovery operations (decontaminating operations) are performed in order to restore the $NO_X$ absorbing capacity of the $NO_X$ occluding and reducing catalyst.

Figure 19:
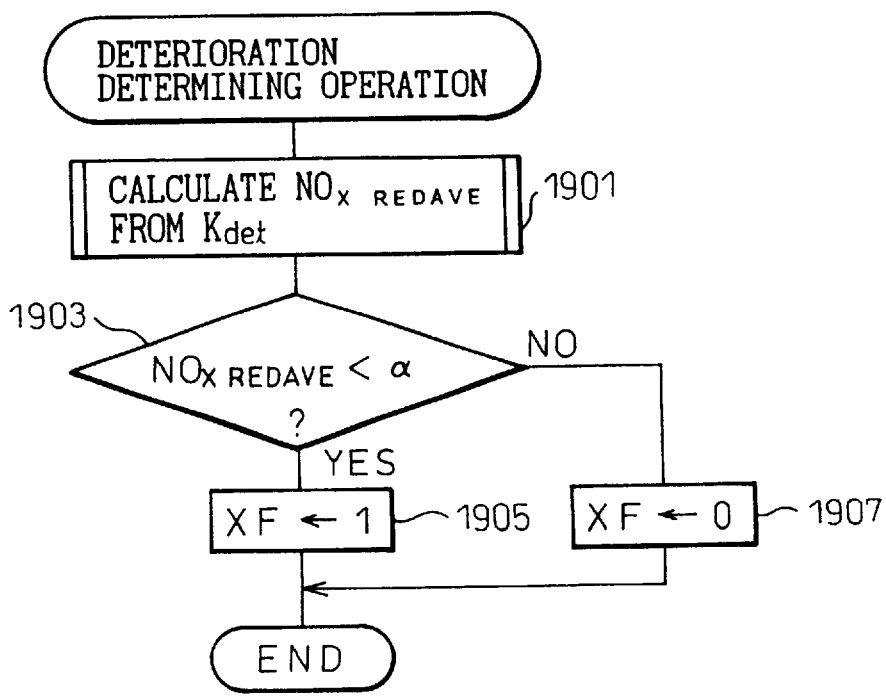
FIG. 19 is a flowchart explaining another example of the evaluating operation of the degree of deterioration of the $NO_x$ occluding and reducing catalyst.

FIG. 19 is a flowchart illustrating the determining operation of the deterioration of the $NO_X$ occluding and reducing catalyst based on the purification performance of the whole system. This operation is performed by a routine executed by the ECU 30 at regular intervals.

In FIG. 19, at step 1901, the purification performance $NO_{XREDAVE}$ is calculated from the deterioration factor $K_{det}$ obtained by the operation in FIG. 15 and the relationship in FIG. 18. At step 1903, it is determined whether the purification performance $NO_{XREDAVE}$ is lower than a predetermined reference value $\alpha$. As is seen from FIG. 18, the reference value $\alpha$ of the purification performance $NO_{XRE-}$ $_{DAVE}$ corresponds to the point where the NO$_{XREDAVE}$ starts to fall rapidly. If NO$_{XREDAVE}$<α at step 1903, since this means that the NO$_X$ occluding and reducing catalyst has deteriorated beyond the maximum limit, the operation sets the value of a deterioration flag XF to 1. If NO$_{XREDAVE}$≧α at step 1903, the value of the flag XF is set to 0 at step 1907. The value of the flag XF may be stored in a nonvolatile memory to prepare for future maintenance and inspection. Further, in this embodiment, recovery operations (decontaminating operations) of the NO$_X$ occluding and reducing catalyst, as explained later, are performed when the value of the flag XF is set to 1.

The deterioration of the NO$_X$ occluding and reducing catalyst is caused by various factors. For example, when the size of the absorbent particles becomes larger due to sintering, the NO$_X$ absorbing capacity of the NO$_X$ occluding and reducing catalyst deteriorates, as explained before. Further, the NO$_X$ occluding and reducing catalyst also deteriorates due to SO$_X$ contamination and HC contamination.

When the sulfur contained in the fuel and lubricant of the engine burns in the combustion chamber, sulfur oxides (SO$_X$) are produced in the exhaust gas. When SO$_X$ is contained in the exhaust gas, the NO$_X$ occluding and reducing catalyst absorbs SO$_X$ in the exhaust gas by a mechanism identical to that of the NO$_X$ absorption and holds SO$_X$ in the form of sulfate within the absorbent (such as BaO). However, since a sulfate such as BaSO$_4$ has a higher stability than nitrate, it is difficult to release SO$_X$ from the NO$_X$ occluding and reducing catalyst by the normal rich spike operation. Therefore, when SO$_X$ exists in the exhaust gas, sulfate accumulates in the NO$_X$ occluding and reducing catalyst and, as the amount of SO$_X$ increases, the NO$_X$ absorbing capacity deteriorates. In this specification the deterioration of the NO$_X$ occluding and reducing catalyst caused by the absorbed SO$_X$ is referred to as a SO$_X$ contamination in order to discriminate it from the normal deterioration (i.e., deterioration caused by the growth of the sizes of the absorbent particles). In general, the rate of decrease in the NO$_X$ absorbing capacity caused by the SO$_X$ contamination is larger than that caused by the normal deterioration.

Further, deterioration of the NO$_X$ occluding and reducing catalyst is also caused by HC in the exhaust gas. For example, when the engine is operated in the condition where the amount of HC in the exhaust gas increases (such as in the high load operation), HC in the exhaust gas attaches to the surfaces of the catalytic components (such as platinum Pt) particles. Therefore, if the operation in such conditions continues for some period, the amount of HC attached to the surfaces of the catalytic particles increases and, eventually, covers a large part of the surfaces of the particles. When the catalytic particles are covered with HC, since the oxidation of NO at the surfaces of the catalytic particles does not occur, the amount of NO$_X$ absorbed by the NO$_X$ occluding and reducing catalyst decreases. Thus, deterioration of the NO$_X$ occluding and reducing catalyst due to HC occurs. In this specification, the deterioration of the NO$_X$ occluding and reducing catalyst caused by HC in the exhaust gas is referred to as HC contamination. In general, the rate of decrease in the NO$_X$ absorbing capacity caused by the HC contamination is many times larger than that caused by the SO$_X$ contamination.

As explained above, there are three major type of deterioration of the NO$_X$ occluding and reducing catalyst. Although the NO$_X$ occluding and reducing catalyst cannot recover from the normal deterioration, the catalyst can recover from the SO$_X$ contamination or HC contamination provided that appropriate recovery operations are performed.

For example, the SO$_X$ contamination is caused by the accumulation of sulfate in the absorbent. Sulfate can be dissolved if the rich air-fuel ratio atmosphere continues for a longer time than the normal rich spike operation. Therefore, the NO$_X$ occluding and reducing catalyst may recover from the SO$_X$ contamination by setting the rich spike period longer and the interval between the rich spike operations shorter than normal rich spike operation.

Further, since the HC contamination is caused by HC attached to the surface of the catalytic component, the NO$_X$ occluding and reducing catalyst may recover from the HC contamination by supplying lean air-fuel ratio exhaust gas to the catalyst and oxidizing (burning) HC on the surface of the catalytic particles. Therefore, it is necessary to set the rich spike period shorter and the interval between the rich spike operation longer than the normal rich spike operation in order for the NO$_X$ occluding and reducing catalyst to recover from the HC contamination.

As explained above, in order for the NO$_X$ occluding and reducing catalyst to recover from the deterioration, it is necessary to determine the type of the deterioration (contamination) and to perform an appropriate recovery operation in accordance with the type of the contamination.

In this embodiment, the type of deterioration is determined using the rate of decrease in the NO$_X$ absorbing capacity. As explained before, the rate of decrease in the NO$_X$ absorbing capacity due to the normal deterioration is very small, the rate of the change in the value of K$_{det}$ caused by the normal deterioration is very small. In contrast to the normal deterioration, the rate of change in the value of K$_{det}$ caused by the SO$_X$ contamination is relatively large. Further, the rate of change in the value of K$_{det}$ caused by the HC contamination is very large. Therefore, in this embodiment, the ECU 30 calculates the rate of change RST in the value of K$_{det}$, and determines the type of deterioration of the NO$_X$ occluding and reducing catalyst based on the value of RST.

For example, if the rate of change RST is larger than a predetermined value RHC, the ECU 30 determines that the deterioration of the NO$_X$ occluding and reducing catalyst was caused by the HC contamination and performs the recovery operation suitable for the HC contamination. Further, if RST is smaller than RHC but larger than another predetermined value RSOX, the ECU 30 determines that the deterioration of the NO$_X$ occluding and reducing catalyst was caused by the SO$_X$ contamination, and performs the recovery operation suitable for the SO$_X$ contamination. If RST is smaller than RSOX, the deterioration of the NO$_X$ occluding and reducing catalyst is caused by the normal deterioration and it is difficult to recover NO$_X$ occluding and reducing catalyst from the normal deterioration. Therefore, in this case, the ECU 30 activates an alarm to warn the driver that the NO$_X$ occluding and reducing catalyst must be replaced.

Figure 20:
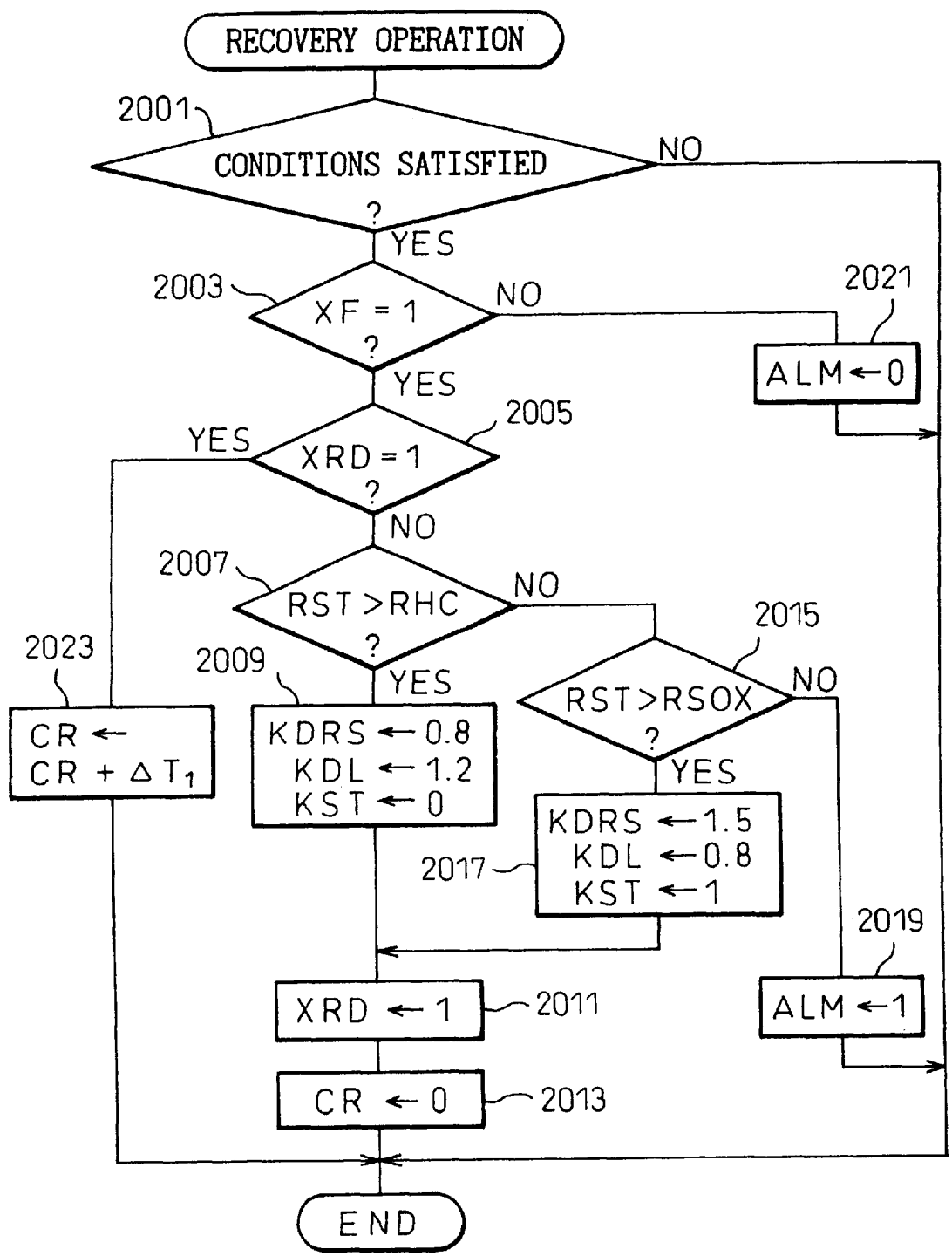

FIG. 20 is a flowchart explaining the recovery operation of the NO$_X$ occluding and reducing catalyst as explained above. This operation is performed by a routine executed by the ECU 30 at regular intervals.

In FIG. 20, at step 2001, it is determined whether the condition for performing the recovery operation is satisfied. In this embodiment, the condition determined at step 2001 is that a predetermined time has lapsed since the recovery operation is last performed. If the predetermined time has not lapsed, the operation terminates immediately, i.e., the recovery operation is not performed. In this embodiment, if the $NO_X$ occluding and reducing catalyst does not recover from the deterioration (i.e., when the value of the flag is not reset to 0), the recovery operation is repeated. However, even if the $NO_X$ occluding and reducing catalyst is recovered from the deterioration, it takes some time before the values of $K_{det}$ and the rate of change RST reflects the recovery of the catalyst. Therefore, in order to eliminate the possibility that the recovery operation is repeated even though the $NO_X$ occluding and reducing catalyst has recovered from the deterioration, this embodiment does not perform the recovery operation for a predetermined period after the recovery operation was last performed.

If the predetermined time has lapsed at step 2001, the operation executes step 2003 to determines whether the deterioration flag XF is set at 1. The flag XF is set by the operation in FIG. 19 and XF=1 indicates that the $NO_X$ occluding and reducing catalyst has deteriorated. If XF≠1 at step 2003, since the $NO_X$ occluding and reducing catalyst has not deteriorated, the operation terminates immediately after setting the value of a flag ALM to 0 at step 2021. When the flag ALM is set to 1, an alarm is activated. Since the flag ALM is set to 0 at step 2021, the alarm is deactivated in this case.

On the other hand, if XF=1 at step 2003, the operation executes step 2005 to determine whether the value of another flag XRD is set at 1. The flag XRD indicates whether the recovery operation is in progress, and XRD=1 means that the recovery operation is in progress.

If XRD≠1 at step 2005, this means that the recovery operation is not in progress though the $NO_X$ occluding and reducing catalyst has deteriorated (i.e., XF=1 at step 2003). Therefore, in this case, the operation determines the type of deterioration at steps 2007 and 2015 in order to perform the recovery operation suitable for the type of deterioration.

Namely, at step 2007, the operation determines whether the rate of change RST in the value of $K_{det}$ is larger than a predetermined value RHC. The rate of change RST in the value of $K_{det}$ is calculated by a separate routine performed by the ECU 30 at regular intervals. If RST>RHC at step 2007, since this means that the deterioration was caused by the HC contamination, the operation sets the engine operating parameters at values suitable for the recovery from the HC contamination at step 2009. Namely, at step 2009, a rich spike period correction factor KDRS is set at 0.8, a rich spike interval correction factor KDL is set at 1.2. Further, a stoichiometric air-fuel ratio operation correction factor KST is set at 0.

When the rich spike period correction factor KDRS is set at 0.8, the length of the rich air-fuel ratio operation during the rich spike operation becomes 0.8 times shorter than that of the normal rich spike operation. Further, when the rich spike interval correction factor KDL is set at 1.2, the interval between the rich spike operations becomes 1.2 times longer than that of the normal rich spike operation. Therefore, a lean air-fuel ratio exhaust gas is supplied to the $NO_X$ occluding and reducing catalyst 7 for a period longer than the normal operation of the engine. The stoichiometric air-fuel ratio operation correction factor KST determines the width of the operating range where the engine is operated at a stoichiometric air-fuel ratio. Though the engine 1 in this embodiment is operated at a lean air-fuel ratio in the normal operating range, the engine 1 is switched to the stoichiometric air-fuel ratio operation in specific operating ranges such as high load operation range. When the value of the factor KST is set to 1, the operating range where the engine is operated at a stoichiometric air-fuel ratio is set at a wider range. At step 2009, since the factor KST is set at 0, the operating range where the engine stoichiometric air-fuel ratio operation is performed is set in a relatively narrow range. Therefore, the frequency of the lean air-fuel ratio operation of the engine increases.

On the other hand, if RST≦RHC at step 2007, this means that the cause of the deterioration is not the HC contamination. Therefore, the operation executes step 2015 to determine whether the deterioration was caused by the $SO_X$ contamination. Namely, at step 2015, it is determined whether RST is larger than the predetermined value RSOX (RSOX is a value smaller than RHC). If RST>RSOX, since this means that the deterioration was caused by the $SO_X$ contamination, the operation executes step 2017 to set the values of the factors KDRS, KDL and KST to 1.5, 0.8 and 1, respectively. When KDRS is set at 1.5, the length of the rich air-fuel ratio operation during the rich spike operation becomes 1.5 times longer than that of the normal rich spike operation. Further, when the rich spike interval correction factor KDL is set at 0.8, the interval between the rich spike operations becomes 0.8 times shorter than that of the normal rich spike operation. Therefore, a rich air-fuel ratio exhaust gas is supplied to the $NO_X$ occluding and reducing catalyst 7 for a period longer than the normal operation of the engine. Further, when the value of the factor KST is set to 1, the operating range where the engine is operated at a stoichiometric air-fuel ratio is set at a wider range. Therefore, the frequency of the stoichiometric air-fuel ratio operation of the engine increases.

After setting the values of the parameters KDRS, KDL and KST at step 2009 or step 2017, the value of the flag XRD is set to 1 (i.e., the recovery operation is in progress) and the value of a counter CR is reset to 0 at step 2013 before the operation terminates. Since the flag XRD is set to 1, when the operation is next performed, operation executes step 2023 after step 2005. Thus, the value of the counter CR is increased by $\Delta T_1$ every time the operation is performed. $\Delta T_1$ is the interval between the operations performed in FIG. 20. Therefore, the value of the counter CR represents the time lapsed since the recovery operation started.

If RST≦RSOX at step 2015, this means that the deterioration of the $NO_X$ occluding and reducing catalyst is not caused by the HC contamination nor the $SO_X$ contamination. Therefore, it can be considered that the deterioration of the $NO_X$ occluding and reducing catalyst was caused by the normal deterioration. Since it is difficult to recover from the normal deterioration, in this case, the operation executes step 2019 to activate the alarm by setting the value of the flag to 1. Thus, the driver is warned that the $NO_X$ occluding and reducing catalyst needs to be replaced.

FIG. 21 is a flowchart illustrating the operation for determining the timing for terminating the recovery operation. This determining operation is performed by a routine executed by the ECU 30 at regular intervals. In this operation, the recovery operation is terminated when a predetermined time has lapsed since the recovery operation started.

At step 2101 in FIG. 21, it is determined whether the value of the counter CR reaches a predetermined value $CR_0$ and, if $CR<CR_0$ the operation terminates immediately without executing steps 2103 through 2105. Namely, the recovery operation continues until the value of the counter CR reaches $CR_0$. If $CR≧CR_0$ at step 2101, i.e., if the recovery operation is performed for a predetermined time $CR_0$, the operation performs step 2103 to reset the value of the flag to 0, and step 2105 to set the values of the factors KDRS, KDL and KST to 1.0, 1.0 and 0, respectively. Therefore, the normal rich spike operation is resumed, and the operating range where the stoichiometric air-fuel ratio operation of the engine is performed is set to a narrow range.

As explained above, according to the present embodiment, the deterioration factor $K_{det}$ and the rate of change thereof RST are calculated and, the type of deterioration is determined from RST. Therefore, an appropriate recovery operation can be performed in accordance with the type of the deterioration.

What is claimed is:

1. An exhaust gas purification device for an engine comprising:

a $NO_X$ occluding and reducing catalyst disposed in the exhaust gas passage of an internal combustion engine and absorbing $NO_X$ in the exhaust gas when the air-fuel ratio of the exhaust gas flowing into the catalyst is at a lean air-fuel ratio and releasing and reducing the absorbed $NO_X$ when the air-fuel ratio of the exhaust gas flowing into the catalyst is at a stoichiometric or a rich air-fuel ratio;

an air-fuel ratio sensor disposed in the exhaust gas passage downstream of the catalyst and detecting the air-fuel ratio of the exhaust gas flowing out from the catalyst;

rich spike means for carrying out a rich spike operation for changing the air-fuel ratio of the exhaust gas flowing into the catalyst from a lean air-fuel ratio to a rich air-fuel ratio and, after maintaining the rich air-fuel ratio for a predetermined rich spike period, from the rich air-fuel ratio to a lean air-fuel ratio;

evaluating means for evaluating the degree of deterioration of the catalyst based on an actual rich spike time and a reference rich spike time, wherein the actual rich spike time is defined by the time lapsed from the time where the air-fuel ratio of the exhaust gas flowing out from the catalyst becomes stoichiometric to the time where the air-fuel ratio of the exhaust gas flowing out from the catalyst becomes lower than a stoichiometric air-fuel ratio after the rich spike operation starts and the reference rich spike time is defined by the time required for a new $NO_X$ occluding and reducing catalyst to release the absorbed $NO_X$.

2. An exhaust gas purification device as set forth in claim 1, further comprising correcting means for correcting the reference rich spike time in accordance with the engine operating condition and wherein the evaluating means evaluates the degree of deterioration of the catalyst based on the actual rich spike time and the reference rich spike time after it is corrected.

3. An exhaust gas purification device as set forth in claim 1, further comprising a rich spike period correcting means for correcting the length of the rich spike period of the rich spike operation carried out by the rich spike means based on the degree of deterioration of the catalyst evaluated by the evaluating means.

4. An exhaust gas purification device as set forth in claim 2, further comprising a rich spike period correcting means for correcting the length of the rich spike period of the rich spike operation carried out by the rich spike means based on the degree of deterioration of the catalyst evaluated by the evaluating means.

5. An exhaust gas purification device as set forth in claim 1, further comprising interval setting means for setting the interval between the rich spike operations carried out by the rich spike means based on the degree of deterioration of the catalyst evaluated by the evaluating means.

6. An exhaust gas purification device as set forth in claim 2, further comprising interval setting means for setting the interval between the rich spike operations carried out by the rich spike means based on the degree of deterioration of the catalyst evaluated by the evaluating means.

7. An exhaust gas purification device as set forth in claim 1, further comprising deterioration type discriminating means for discriminating the type of deterioration of the catalyst based on the rate of change in the degree of deterioration of the catalyst evaluated by the evaluating means.

8. An exhaust gas purification device as set forth in claim 2, further comprising deterioration type discriminating means for discriminating the type of deterioration of the catalyst based on the rate of change in the degree of deterioration of the catalyst evaluated by the evaluating means.

9. An exhaust gas purification device as set forth in claim 7, further comprising rich spike period adjusting means for adjusting the length of the rich spike period of the rich spike operation carried out by the rich spike means in accordance with the type of the deterioration of the catalyst.

10. An exhaust gas purification device as set forth in claim 8, further comprising rich spike period adjusting means for adjusting the length of the rich spike period of the rich spike operation carried out by the rich spike means in accordance with the type of the deterioration of the catalyst.

11. An exhaust gas purification device as set forth in claim 7, further comprising interval adjusting means for adjusting the interval between the rich spike operations carried out by the rich spike means in accordance with the type of deterioration of the catalyst.

12. An exhaust gas purification device as set forth in claim 8, further comprising interval adjusting means for adjusting the interval between the rich spike operations carried out by the rich spike means in accordance with the type of deterioration of the catalyst.

* * * * *